(12) United States Patent
Wang et al.

(10) Patent No.: US 9,128,850 B2
(45) Date of Patent: Sep. 8, 2015

(54) MULTI-PORTED MEMORY WITH MULTIPLE ACCESS SUPPORT

(71) Applicant: Broadcom Corporation, Irvine, CA (US)

(72) Inventors: Weihuang Wang, Los Gatos, CA (US); Chien-Hsien Wu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 321 days.

(21) Appl. No.: 13/716,605

(22) Filed: Dec. 17, 2012

(65) Prior Publication Data

US 2014/0052914 A1 Feb. 20, 2014

Related U.S. Application Data

(60) Provisional application No. 61/729,969, filed on Nov. 26, 2012, provisional application No. 61/683,934, filed on Aug. 16, 2012.

(51) Int. Cl.
*G06F 12/08* (2006.01)

(52) U.S. Cl.
CPC ........ *G06F 12/0846* (2013.01); *G06F 12/0853* (2013.01); *Y02B 60/1225* (2013.01)

(58) Field of Classification Search
CPC .................................................... G06F 12/0853
USPC ............................................................. 711/5
See application file for complete search history.

(56) References Cited

U.S. PATENT DOCUMENTS 6,081,873 A * 6/2000 Hetherington et al. ........ 711/131
2003/0033492 A1 * 2/2003 Akiyama et al. .............. 711/156

* cited by examiner

*Primary Examiner* — Kalpit Parikh
(74) *Attorney, Agent, or Firm* — Fiala & Weaver P.L.L.C.

(57) ABSTRACT

A multi-ported memory that supports multiple read and write accesses is described. The multi-ported memory may include a number of read/write ports that is greater than the number of read/write ports of each memory bank of the multi-ported memory. The multi-ported memory allows for read operation(s) and write operation(s) to be received during the same clock cycle. In the event that an incoming write operation is blocked by read operation(s), data for that write operation may be stored in one of a plurality of cache banks included in the multi-port memory. The cache banks are accessible to both write and read operations. In the event than the write operation is not blocked by read operation(s), a determination is made as to whether data for that incoming write operation is stored in the memory bank targeted by that incoming write operation or in one of the cache banks.

20 Claims, 11 Drawing Sheets

MULTI-PORTED MEMORY WITH MULTIPLE ACCESS SUPPORT

CROSS REFERENCE TO RELATED APPLICATION

This application claims priority to U.S. Provisional Application Ser. No. 61/683,934, filed on Aug. 16, 2012, and U.S. Provisional Application Ser. No. 61/729,969, filed on Nov. 26, 2012, which are incorporated by reference herein in their entirety.

BACKGROUND

1. Technical Field

The subject matter described herein relates to memory devices. In particular, the subject matter described herein relates to random access memory (RAM) devices, such as static random access memory (SRAM) devices.

2. Description of Related Art

High bandwidth, on-chip memory is required for a wide range of applications, including but not limited to multi-core processors, parallel computing systems, or the like. It would be beneficial if a high bandwidth, on-chip memory could be designed that could concurrently handle two read and two write accesses with low latency.

Single-port (SP) SRAM memory, which supports either one read or one write each clock cycle, is widely used for on-chip memory. Such memory can be extended to support two simultaneous read or write operations by running the internal memory core at twice the clock frequency, herein referred to as pseudo-dual-port (PD) memory. True dual-port memory can be designed to support two read or write operations as well, with less memory density and typically custom design.

4-port register files (RF) exist in the art. Such 4-port RF allows two read and two write operations to be performed simultaneously. They are typically custom designed and available only at a small number of bits and are three times worse in area density as compared with single-port (SP) SRAM in a 40 nanometer (nm) General Purpose (40G) manufacturing process.

Dual-pumped dual-port (DDP) memory is another type of customized design currently being used. DDP memory uses internally a dual-port memory, which allows two simultaneous read or write operations, and runs internal memory at twice the clock frequency to allow for four simultaneous read or write operations. DDP memory consumes 70% more area and power as compared with SP and PD memory in a 40G manufacturing process.

BRIEF DESCRIPTION OF THE DRAWINGS/FIGURES

The accompanying drawings, which are incorporated herein and form part of the specification, illustrate the subject matter of the present application and, together with the description, further serve to explain the principles of the embodiment described herein and to enable a person skilled in the relevant art(s) to make and use such embodiments.

Figure 1:
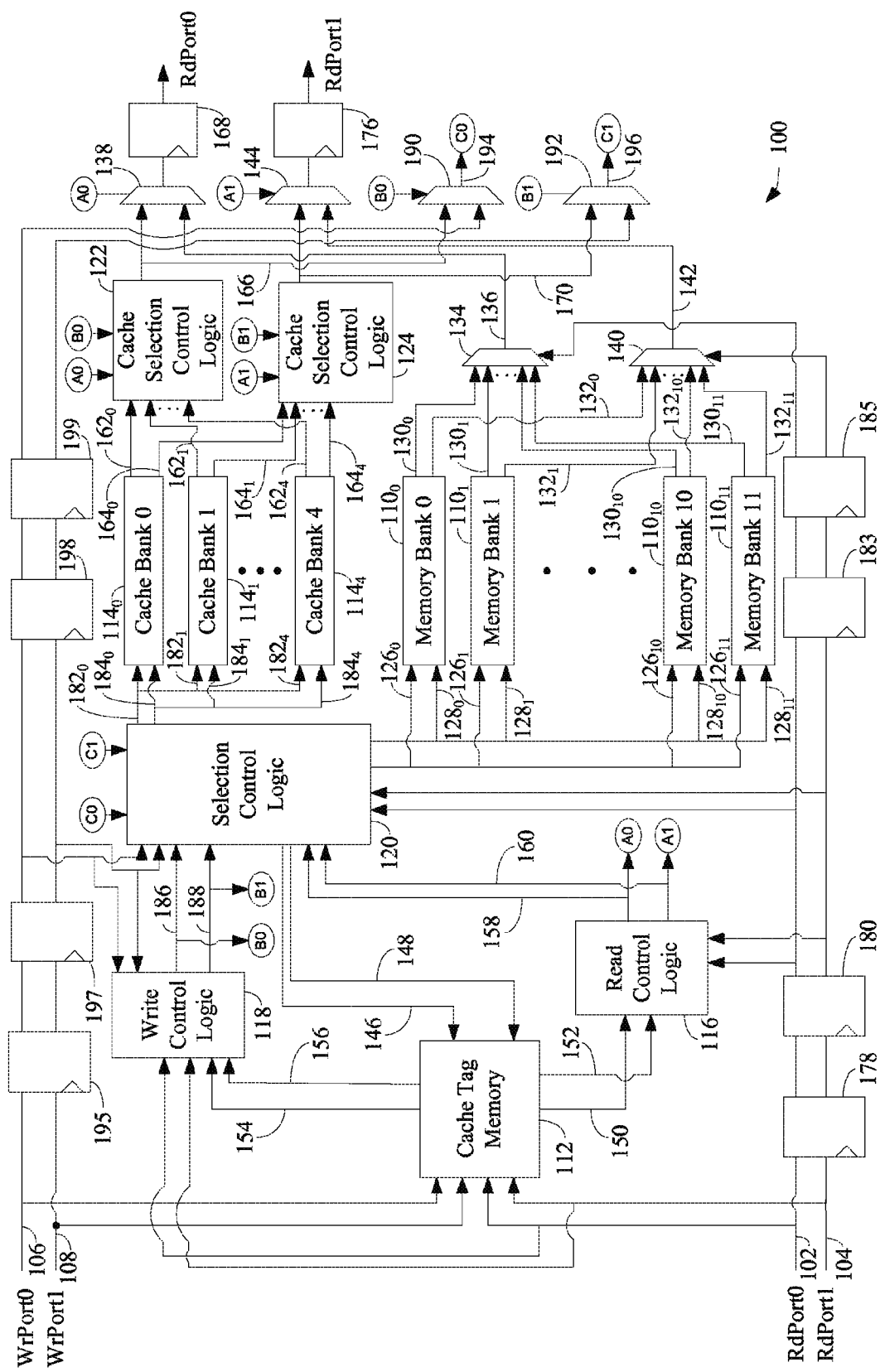
FIG. 1 is a block diagram of a memory in accordance with an embodiment.

The features and advantages of the subject matter of the present application will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

A multi-ported memory that includes a plurality of memory banks and that supports multiple read and write accesses is described herein. The multi-ported memory may include a number of read/write ports that is greater than the number of read/write ports of each memory bank of the multi-ported memory. The multi-ported memory allows for at least one read operation and at least one write operation to be received during the same clock cycle. In the event that an incoming write operation is blocked by the at least one read operation, data for that incoming write operation may be stored in one of a plurality of cache banks included in the multi-port memory. That cache bank is accessible to both write operations and read operations. In the event than the incoming write operation is not blocked by the at least one read operation, a determination is made as to whether data for that incoming write operation is stored in the memory bank targeted by that incoming write operation or in one of the plurality of cache banks.

In the embodiment described below, the multi-ported memory is a quad-access cached dual-port (QCDP) memory that realizes quad-port access (two read operations and two write operations received during the same clock cycle) at high speed, with dual-ported memory banks. The QCDP memory consumes significantly less power and area as compared to custom-built DDP memory in a 40G manufacturing process, especially with larger memory configurations.

It is noted that the techniques used to implement the QCDP memory could conceivably be applied to other memories that allow more same-cycle accesses than would otherwise be allowed by the memory banks included therein. For example, the techniques described herein may be applied to a two-access single-port memory to enable such memory to support two-port access (a single read operation and a single write operation received during the same clock cycle) at high speed using single-ported memory banks, or to an eight-access four-port memory to enable such memory to realize eight-port access (four read operations and four write operations received during the same clock cycle) at high speed using four-ported memory banks, and so on.

In particular, a memory device is described herein. The memory device includes one or more memory banks, a plurality of cache banks coupled to each of the one or more memory banks, and control logic coupled to each of the one or more memory banks and to the plurality of cache banks. The control logic is configured to determine whether one of the plurality of cache banks contains a cache line corresponding to a location to which data is to be written to in a first target memory bank among the one or more memory banks by a first incoming write operation. The control logic is also configured to determine whether the first incoming write operation is blocked by at least one incoming read operation configured to read data from a second target memory bank among the one or more memory banks in response to a determination that one of the plurality of cache banks does not contain a cache line corresponding to the location to which data is to be written to in the first target memory bank by the first incoming write operation. The control logic is also configured to write the data associated with the first incoming write operation to the first target memory bank in response to a determination that the first incoming write operation is not blocked by the at least one incoming read operation and determine whether the data associated with the first incoming write operation is to be written to either one of the plurality of cache banks or the first target memory bank in response to a determination that the first incoming write operation is blocked by the at least one incoming read operation.

A method is also described herein. In accordance with the method, a determination is made whether one of a plurality of cache banks contains a cache line corresponding to a location to which data is to be written to in a first target memory bank among one or more memory banks by a first incoming write operation. In response to determining that one of plurality of cache banks does not contain a cache line corresponding to the location to which data is to be written to in the first target memory bank by the first incoming write operation, a determination is made whether the first incoming write operation is blocked by at least one incoming read operation configured to read data from a second target memory bank among the one or more memory banks. In response to determining that the first incoming write operation is not blocked by the at least one incoming read operation, the data associated with the first incoming write operation is written to the first target memory bank. In response to determining that the first incoming write operation is blocked by the at least one incoming read operation, a determination is made whether the data associated with the first incoming write operation is to be written to either one of the plurality of cache banks or the first target memory bank.

An apparatus is further described herein. The apparatus includes control logic coupled to each of one or more memory banks and to a plurality of cache banks. The control logic is configured to determine whether one of the plurality of cache banks contains a cache line corresponding to a location to which data is to be written to in a first target memory bank among the one or more memory banks by a first incoming write operation. The control logic is also configured to determine whether the first incoming write operation is blocked by at least one incoming read operation configured to read data from a second target memory bank among the one or more memory banks in response to a determination that one of the plurality of cache banks does not contain a cache line corresponding to the location to which data is to be written to in the first target memory bank by the first incoming write operation. The control logic is also configured to write the data associated with the first incoming write operation to the first target memory bank in response to a determination that the first incoming write operation is not blocked by the at least one incoming read operation and determine whether the data associated with the first incoming write operation is to be written to either one of the plurality of cache banks or the first target memory bank in response to a determination that the first incoming write operation is blocked by the at least one incoming read operation.

II. Quad-Access Cached Dual-Port (QCDP) Memory

A quad-access cached dual-port (QCDP) memory is described herein that realizes quad-port access at high speed, with dual-ported memory banks. The QCDP allows for two read operations and two write operations to be received during the same clock cycle. In the event that an incoming write operation is blocked by at least one of the two incoming read operations or another incoming write operation, data for the incoming write operation may be stored in one of a plurality of cache banks included in the QCDP memory. The cache is accessible to both write operations and read operations. The QCDP memory consumes significantly less power and area as compared to custom-built DDP memory in a 40G manufacturing process, especially with larger memory configurations.

FIG. 1 is a block diagram of a QCDP memory 100 in accordance with one embodiment. As shown in FIG. 1, QCDP memory 100 includes a first read port 102 (RdPort0), a second read port 104 (RdPort1), a first write port 106 (WrPort0), a second write port 108 (WrPort1), a plurality of memory banks $110_0$-$110_{11}$, a cache tag memory 112, a plurality of cache banks $114_0$-$114_4$, read control logic 116, write control logic 118, selection control logic 120, first cache selection control logic 122, and second cache selection control logic 124. First read port 102, second read port 104, first write port 106, and second write port 108 are each coupled, either directly or indirectly, to memory banks $110_0$-$110_{11}$, cache tag memory 112, and cache banks $114_0$-$114_4$.

First read port 102 is configured to receive a plurality of signals associated with a first incoming read operation via a plurality of read signal lines, and second read port 104 is configured to receive a plurality of signals associated with a second incoming read operation via a plurality of read signal lines. The plurality of read signal lines includes a clock signal line, a read valid signal line, and read address signal lines. The plurality of read signal lines may include other signal lines as well.

The clock signal line is utilized to carry a clock signal that controls the timing of the incoming read operations. The read valid signal line is utilized to carry a read valid signal that, when asserted, indicates that an incoming read operation is being received by QCDP memory 100. The read address signal lines are configured to carry read address signals that identify a target memory location in QCDP memory 100 from which data is to be read. A first set of one or more read address signals identify one of memory banks $110_0$-$110_{11}$ from which data is to be read and thus may be referred to as "bank address signals", and a second set of one or more read address signals identify a location within the identified memory bank and thus may be referred to as "address index signals".

For example, suppose that QCDP memory 100 includes twelve memory banks $110_0$-$110_{11}$ (as depicted in FIG. 1), and each of memory banks $110_0$-$110_{11}$ is configured to include 2048 rows. In this example, address signal lines [14:11] may be designated as the bank address signals that are used to identify the memory bank to be read, and address signal lines [10:0] may be designated as the address index signals that are used to identify the row in the identified memory bank to be read.

First read port 102 is also configured to output a plurality of read data signals associated with a first incoming read operation via a plurality of read data signal lines, and second read port 104 is also configured to output a plurality of read data signals associated with the second incoming read operation via a plurality of read data signal lines. The plurality of read data signal lines associated with first read port 102 are utilized to output data from QCDP memory 100 that is read via the first incoming read operation, and the plurality of data signal lines associated with second read port 104 are utilized to output data from QCDP memory 100 that is read via the second incoming read operation.

First read port 102 may also be configured to output a read output enable signal via a read output enable signal line, and second read port 102 may also be configured to output a read output enable signal via a read output enable signal line. The read output enable signal associated with first read port 102 may indicate, when asserted, that data being output via the read data signals lines of first read port 102 is valid. The read output enable signal associated with second read port 104 may indicate, when asserted, that data being output via the read data signals lines of second read port 104 is valid.

First write port 106 is configured to receive a plurality of write signals associated with a first incoming write operation via a plurality of write signal lines, and second write port 108 is configured to receive a plurality of write signals associated with a second incoming write operation via a plurality of write signal lines. The plurality of write signals lines includes a clock signal line, a write valid signal line, write address signal lines, and write data lines. The plurality of write signal lines may include other signal lines as well.

The clock signal line is configured to carry a clock signal that controls the timing of the incoming write operations. In one embodiment, the clock signal for an incoming write operation is received via the same clock signal line that is used to receive the clock signal for an incoming read operation. In another embodiment, the clock signal for an incoming write operation is received via a different clock signal line than that used to receive the clock signal for an incoming read operation. The write valid signal line is utilized to carry a write valid signal that, when asserted, indicates that an incoming write operation is being received by QCDP memory 100. In one embodiment, QCDP memory 100 includes a single valid signal line that is utilized to carry a single valid signal that identifies whether an incoming read operation or an incoming write operation is being received. For instance, when asserted high, the valid signal may indicate that an incoming write operation is being received. When asserted low, the valid signal may indicate that an incoming read operation is being received. The write data lines are utilized to carry data that is to be written to QCDP memory 100, which may be referred to as "write data". The write address signal lines are utilized to carry write address signals that identify a target memory location in QCDP memory 100 to which data is to be written. For example, a first set of one or more write address signals identify one of memory banks $110_0$-$110_{11}$ to which data is to be written and thus may be referred to as "bank address signals", and a second set of one or more write address signals identify a location within the identified memory bank to be written and thus may be referred to as "address index signals".

In the example QCDP memory shown in FIG. 1, write address signals may be utilized in a similar manner to read address signals. That is, address signal lines [14:11] may be designated as the bank address signals that are used to identify the memory bank to be written, and address signal lines [10:0] may be designated as the address index signals that are used to identify the row in the identified memory bank to be written.

In one embodiment, QCDP memory 100 includes a single set of address signal lines that are configured to carry both the read address signals and the write address signals. Similarly, QCDP memory 100 may also include a single set of data signal lines that are configured to carry both the data to be read from QCDP memory 100 and the data to be written to QCDP memory 100. In accordance with such an embodiment, the read output enable signal may be used to differentiate the data being carried via the single set of data signal lines. For example, the read output enable signal, when asserted, may indicate that data read from QCDP memory 100 is being carried via the single set of data signal lines. When de-asserted, the read output enable signal may indicate that data to be written to QCDP memory 100 is being carried via the single set of data signal lines.

As shown in FIG. 1, QCDP memory 100 may be configured to include twelve memory banks $110_0$-$110_{11}$. However, persons skilled in the relevant art(s) will recognize that any number of memory banks may be included in QCDP memory 100.

Each of memory banks $110_0$-$110_{11}$ may include memory cells that are arranged in rows and columns. Each of memory banks $110_0$-$110_{11}$ may be configured to include the same number of memory cells. Each memory cell may be configured to store a bit of data and has a unique address defined by the intersection of a row and a column. Data may be read from or written to a row of any of memory banks $110_0$-$110_{11}$ via an incoming read or write operation, respectively.

For an incoming read operation, the read address signals received via read ports 102, 104 may be input into selection control logic 120. Selection control logic 120 uses the read address signals (e.g., the bank address signals) to identify from which one of memory banks $110_0$-$110_{11}$ data is to be read and outputs a bank select signal (e.g., via signal lines $126_0$-$126_{11}$ if the incoming read operation was received via first read port 102 or via signal lines $128_0$-$128_{11}$ if the incoming read operation was received via second read port 104) that selects the identified memory bank to be read. Selection control logic 120 may also forward the read address signals (e.g., the address index signals) to the identified memory bank to indicate which row within the identified memory bank is to be selected and read for the incoming read operation.

For an incoming write operation, the write address signals received via write ports 106, 108 may be input into selection control logic 120. Selection control logic 120 uses the write address signals (e.g., the bank address signals) to identify to which one of memory banks $110_0$-$110_{11}$ data is to be written and outputs the bank select signal (e.g., via signal lines $126_0$-$126_{11}$ or $128_0$-$128_{11}$) that selects the identified memory bank to be written. Selection control logic 120 may forward the write address signals (e.g., the address index signals) to the identified memory bank to indicate which row within the identified memory bank is to be selected and written to for the incoming write operation.

Selection control logic 120 may output the bank select signal for an incoming write operation received via first write port 106 via signal lines $126_0$-$126_{11}$ and may output the bank select signal for an incoming write operation received via second write port 108 via signal lines $128_0$-$128_{11}$. However, there may be instances when selection control logic 120 outputs the bank select signal for an incoming write operation received via first write port 106 via signal lines $128_0$-$128_{11}$ and outputs the bank select signal for an incoming write operation received via second write port 108 via signal lines $126_0$-$126_{11}$. For example, suppose that an incoming read operation received via first read port 102 and an incoming write operation received via first write port 106 are received during the same clock cycle. In this example, selection control logic 120 outputs the bank selection signal for the incoming read operation via signal lines $126_0$-$126_{11}$ and outputs the bank selection signal for the incoming write operation via signal lines $128_0$-$128_{11}$. In another example, suppose that an incoming read operation received via second read port 104 and an incoming write operation received via second write port 108 are received during the same clock cycle. In this example, selection control logic 120 outputs the bank selection signal for the incoming read operation via signal lines $128_0$-$128_{11}$ and outputs the bank selection signal for the incoming write operation via signal lines $126_0$-$126_{11}$.

Each of memory banks $110_0$-$110_{11}$ may be dual-ported, where each port is operable to receive either one incoming read operation or one incoming write operation during the same clock cycle. Accordingly, each of memory banks $110_0$-$110_{11}$ may receive two incoming read operations, two incoming write operations, or one incoming read operation and one incoming write operation during the same clock cycle. Therefore, any four given memory banks $110_0$-$110_{11}$ may be accessed during the same clock cycle. Accordingly, selection control logic 120 may be configured to output four bank select signals (e.g., via signal lines $126_0$-$126_{11}$ and signal lines $128_0$-$128_{11}$) to either the same or different memory banks during the same clock cycle. Furthermore, because each of memory banks $110_0$-$110_{11}$ supports two incoming read operations, each of memory banks $110_0$-$110_{11}$ may be configured to output data via two data output signal lines $130_0$-$130_{11}$, $132_0$-$132_{11}$, respectively. Data that is output via data output signal lines $130_0$-$130_{11}$ corresponds to data read for an incoming read operation received via first read port 102, and data that is output via data output signal lines $132_0$-$132_{11}$ corresponds to data read for an incoming read operation received via second read port 104.

Data that is output via data output signal lines $130_0$-$130_{11}$ is input into a multiplexer (mux) 134. Mux 134 is configured to select the memory bank from which data is read out for an incoming read operation received via first read port 102. For example, mux 134 uses bank address signals received via first read port 102 to select which data output signal line from among $130_0$-$130_{11}$ is to provide the data that is read out. The data received via the selected data output signal is provided via a signal line 136 to mux 138, the operation of which is described below in reference to the operations of read control logic 116.

Data that is output via data output signal lines $132_0$-$132_{11}$ is input into mux 140. Mux 140 is configured to select the memory bank from which data is read out for an incoming read operation received via second read port 104. For example, mux 140 uses bank address signals received via second read port 104 to select which data output signal line from among $132_0$-$132_{11}$ is to provide the data that is read out. The data received via the selected data output signal is provided via a signal line 142 to mux 144, the operation of which is described below in reference to the operations of read control logic 116.

In one embodiment, incoming write operations that are configured to write data to the same target memory bank from which two incoming read operations are configured to read data (or from which one incoming read operation is configured to read data and another incoming write operation is configured to write data) are blocked if the incoming write operations are received during the same clock cycle as the two incoming read operations (or the one incoming read operation and the other incoming write operation). Incoming write operations are blocked during these instances because no memory bank ports (shown as being coupled to signal lines $126_0$-$126_{11}$ and signal lines $128_0$-$128_{11}$ in FIG. 1) are available to receive the write control signals and the write data signals while the read operations (and/or write operations) are being performed. Write data for an incoming write operation that is blocked may be stored as a cache line in one of cache banks $114_0$-$114_4$.

Each of cache banks $114_0$-$114_4$ may be dual-ported, where each port is operable to receive either one incoming read operation or one incoming write operation during the same clock cycle. Accordingly, each of cache banks $114_0$-$114_4$ may receive two incoming read operations, two incoming write operations, or one incoming read operation and one incoming write operation during the same clock cycle. Selection control logic 120 may be configured to output cache bank select signals (e.g., via signal lines $182_0$-$182_4$ and signal lines $184_0$-$184_4$) to either the same or different cache banks during the same clock cycle. Furthermore, because each of cache banks $114_0$-$114_4$ supports two incoming read operations, each of cache banks $114_0$-$114_4$ may be configured to output data via two data output signal lines $162_0$-$162_4$, $164_0$-$164_4$, respectively. Data that is output via data output signal lines $162_0$-$162_4$ corresponds to data read for an incoming read operation received via first read port 102, and data that is output via data output signal lines $164_0$-$164_4$ corresponds to data read for an incoming read operation received via second read port 104.

Data that is output via data output signal lines $162_0$-$162_4$ is provided to first cache selection control logic 122, and data that is output via data output signal lines $164_0$-$164_4$ is provided to second cache selection control logic 124. First cache selection control logic 122 and second cache selection control logic 124 are described below in reference to the operations of read control logic 116.

Cache banks may be organized as a set associative cache memory structure, where each cache bank contains a fraction of the number of rows included in each of memory banks $110_0$-$110_{11}$. For example, suppose each of memory banks $110_0$-$110_{11}$ is configured to include 2048 rows. In one embodiment, each of cache banks $114_0$-$114_4$ may be configured to include 512 rows (i.e., ¼$^{th}$ the size of each of memory banks $110_0$-$110_{11}$) In accordance with this embodiment, write data associated with an incoming write operation may be stored in any of four cache banks, thereby effectively making cache banks a 4-way set associative cache. A fifth cache bank (as shown in FIG. 1) may be used to solve cache address conflicts that may arise when the other four cache banks contain write data that is to be written to the address within the same memory bank.

In an embodiment where each of cache banks $114_0$-$114_4$ include 512 rows, address signal lines [8:0] received via first read port 102, second read port 104, first write port 106, or second write port 108 may be designated as cache address index signals that are used to identify a particular row in a particular cache bank. To determine which cache bank is to store the write data, a cache lookup operation is performed on cache tag memory 112, which stores the tags for each of the cache banks $114_0$-$114_4$.

Figure 2:
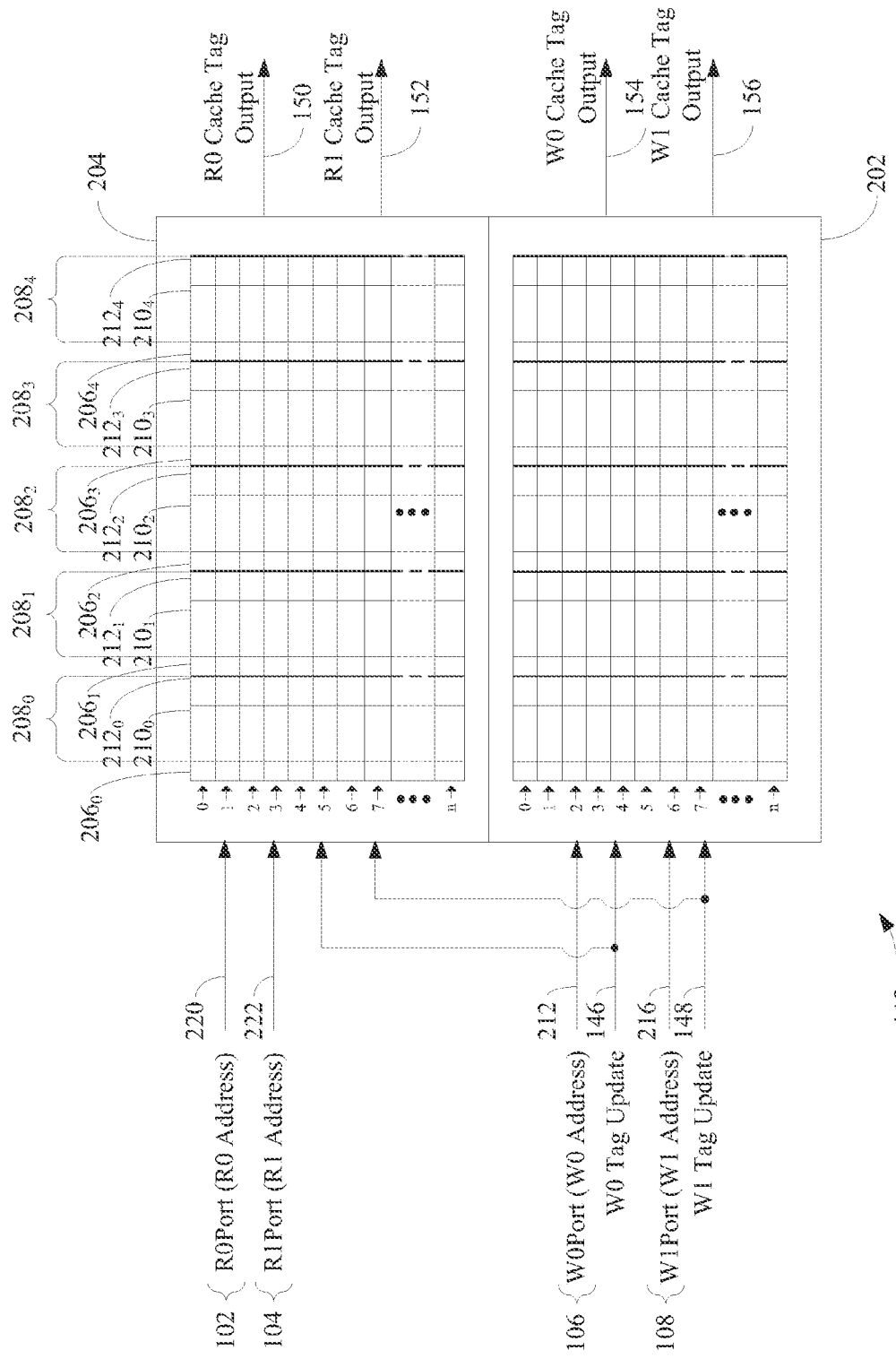
FIG. 2 is a block diagram of a cache tag memory that may be used to implement a memory in accordance with an embodiment.

FIG. 2 is a block diagram of cache tag memory 112 in accordance with one embodiment. As shown in FIG. 2, cache tag memory 112 includes two register files 202, 204 that each contain rows 0-(n−1), where n is equal to the number of rows in each of cache banks $114_0$-$114_4$. Register file 202 is configured to receive write address signals 212 and a write tag update signal 146 (described below) associated with an incoming write operation received via first write port 106. Register file 202 is also configured to receive write address signals 216 and a write tag update signal 148 (described below) associated with an incoming write operation received via second write port 108. Register file 204 is configured to receive read address signals 220 for an incoming read operation received via first read port 102 and read address signals 222 for an incoming read operation received via second read port 104. Register file 204 is also configured to receive write tag update signals 146 and 148. This is because register file 204 is configured to be a mirrored version of register file 202. That is, register file 204 and register file 202 are managed such that they include the same information. Accordingly, when a tag update is performed on register file 202, the same tag update is performed on register file 204. Each of write address signals 212, write address signals 216, read address signals 220, and read address signals 222 include bank address signals and address index signals as described above.

Each row in register files 202, 204 may correspond to a row in any of cache banks $114_0$-$114_4$. A row in register files 202, 204 may be accessed using the address index signals received via first read port 102, second read port 104, first write port 106, or second write port 108. In an embodiment where each register file 202, 204 includes 512 rows, address index signal lines [8:0] received via first read port 102, second read port 104, first write port 106, or second write port 108 may be designated as cache address index signals that are used to identify a particular row in register files 202, 204. Because register file 204 is a mirrored version of register file 202, rows of register file 202 and the corresponding rows of register file 204 represent the same rows within cache banks $114_0$-$114_4$.

Each row of register files 202, 204 includes the tags associated with a cache line located at the corresponding row of cache banks $114_0$-$114_4$. As shown in FIG. 2, each row of register files 202, 204 may include a valid field $206_0$-$206_4$ and a tag field $208_0$-$208_4$ for each cache bank $114_0$-$114_4$. For example, valid field $206_0$ and tag field $208_0$ correspond to cache bank $114_0$, valid field $206_0$ and tag field $208_0$ correspond to cache bank $114_0$, valid field $206_1$ and tag field $208_1$ correspond to cache bank $114_1$, valid field $206_2$ and tag field $208_2$ correspond to cache bank $114_2$, valid field $206_3$ and tag field $208_3$ correspond to cache bank $114_3$, and valid field $206_4$ and tag field $208_4$ correspond to cache bank $114_4$.

Each valid field $206_0$-$206_4$ may store a value indicating whether the data stored in a corresponding row of a respective cache bank $114_0$-$114_4$ is valid (i.e., not stale). For example, a value of '1' may indicate that data stored in a corresponding row in the respective cache bank $114_0$-$114_4$ is valid, whereas a value of '0' may indicate that data stored in a corresponding row in the respective cache bank $114_0$-$114_4$ is not valid. Each tag field $208_0$-$208_4$ may contain the address information required to identify whether data in a particular location in cache banks $114_0$-$114_4$ corresponds to data to be written to or read from a target memory bank by an incoming write operation or incoming read operation, respectively. A positive identification is referred to as a "cache hit," whereas a negative identification is referred to as a "cache miss."

The tag may contain the upper portion of the address that corresponds to the portion of the address that is not used as an index into a cache bank $114_0$-$114_4$ and cache tag memory 112. The reason for this is that the portion of the address received via first read port 102, second read port 104, first write port 106, and second write port 108 that corresponds to the cache address index is used to select the unique entry in cache tag memory 112 and cache banks $114_0$-$114_4$. Thus, only the upper portion of an address received via first read port 102, second read port 104, first write port 106, and second write port 108 that is not used as the cache address index is compared to the tags stored in cache tag memory 112 to determine whether there is a "cache hit" or "cache miss."

In an embodiment where register files 202, 204 and cache banks $114_0$-$114_4$ each include 512 rows and each of memory banks $110_0$-$110_{11}$ include 2048 rows, the upper portion of the address received that is not used as the cache address index are the bank address signals (received via address signal lines [14:11]) and the two most significant bits (MSBs) of the address index signals (e.g., received via address signal lines [10:9]). This upper portion of the address may be referred to as the "tag address."

Accordingly, as shown in FIG. 2, each tag field $208_0$-$208_4$ may include a bank address field $210_0$-$210_4$ and MSB field $212_0$-$212_4$. Each bank address field $210_0$-$210_4$ may store a value that represents a target memory bank to which data stored in a corresponding row of a respective cache bank $114_0$-$114_4$ is to be written to for a blocked write operation. In the example shown in FIG. 1, where QCDP memory 100 includes twelve memory banks $110_0$-$110_{11}$, each tag field $208_0$-$208_4$ stores a 4-bit value equal to bank address signals received via first read port 102, second read port 104, first write port 106, or second write port 108. Continuing with the example shown in FIG. 1, each MSB field $212_0$-$212_4$ may store a 2-bit value equal to the two most significant bits of the address index signals received via first read port 102, second read port 104, first write port 106, or second write port 108.

In one embodiment, the invalidity of a cache line in a particular cache bank $114_0$-$114_4$ may be indicated by a value stored in each of bank address fields $210_0$-$210_4$, thereby eliminating the need for valid fields $206_0$-$206_4$. For instance, using the example above, only the values 0×0-0×B are needed to represent memory banks $110_0$-$110_{11}$, respectively. As such, any of the values that are not used to represent memory banks $110_0$-$110_{11}$ (i.e., 0×C, 0×D, 0×E, or 0×F) could be used to indicate that data stored in a corresponding row of a respective cache bank $114_0$-$114_4$ is invalid.

Tags may be accessed via read and write cache lookup operations. The mirrored nature of register files 202 and 204 advantageously allows the read and write cache lookup operations to be received during the same clock cycle. That is, two read cache lookup operations and two write cache lookup operations may all be received during the same clock cycle.

Read cache lookup operations are directed to register file 204 and write cache lookup operations are directed to register file 202. Although the read and write lookup operations may be received during the same clock cycle, the lookup operations may take one or more clock cycles to complete.

Read and write cache lookup operations are performed on cache tag memory 112 in response to receiving incoming read and write operations, respectively. A particular row of cache tag memory 112 may be selected using the cache address index signals as described above. Contents (i.e., the tags for each of cache banks $114_0$-$114_4$) of the selected row may be output from cache tag memory 112 via one of signal lines 150, signal lines 152, signal lines 154, or signal lines 156. For example, contents from a row selected in response to receiving an incoming read operation via first read port 102 may be output via signal lines 150 and input into read control logic 116 (shown in FIG. 1). Contents from a row selected in response to receiving an incoming read operation via second read port 104 may be output via signal lines 152 and input into read control logic 116 (shown in FIG. 1). Contents from a row selected in response to receiving an incoming write operation via first write port 106 may be output via signal lines 154 and input into write control logic 118 (shown in FIG. 1). Contents from a row selected in response to receiving an incoming write operation via second write port 108 may be output via signal lines 156 and input into write control logic 118 (shown in FIG. 1).

Contents of cache tag memory 112 may be updated via tag updates received via write tag update signal 146 and write tag update signal 148. For example, when write data associated with an incoming write operation received via first write port 106 or second write port 108 is stored in one of cache banks $114_0$-$114_4$ due to being blocking by an incoming read operation, a cache bank identifier that identifies the cache bank to which the write data is written and the address to which the write data is to be written by the incoming write operation are provided to cache tag memory 112 from selection control logic 120 via write tag update signal 146 or write tag update signal 148, respectively (as shown in FIG. 1). Using the received cache bank identifier and received address, the tag field corresponding to the identified cache bank and located in a row of cache tag memory 112 identified using the cache address index derived from the received address may be updated. The tag field may be updated with the bank address and two most significant bits of the address index derived from the received address. In an embodiment where each tag field has a corresponding valid field, the valid field may also be set with a value of '1' to indicate that the data stored in a corresponding row of a respective cache bank $114_0$-$114_4$ is valid Tag updates may also invalidate contents stored in cache tag memory 112. For example, in the event that write data is written to a memory bank even when a cache line corresponding to a location to be written to in a memory bank targeted by the incoming write operation is stored in one of cache banks $114_0$-$114_4$ (as is described below with reference to FIGS. 6A-6C), the corresponding tag in cache tag memory 112 is invalidated because cache banks $114_0$-$114_4$ no longer contain the most recent data for the address associated with the cache line. The tag may be invalidated by receiving an invalidation indicator via write tag update signal 146 or write tag update signal 148. In response to receiving the invalidation indicator, the valid field may be set with a value of '0' to indicate that the value stored in the corresponding tag field is invalid. In an embodiment where a valid field is not used, the bank address field may be set with a value that is not used to represent memory banks $110_0$-$110_{11}$ (i.e., 0×C, 0×D, 0×E, or 0×F).

Referring again to FIG. 1, read control logic 116 is coupled to first read port 102, second read port 104, cache tag memory 112 (via signal lines 150 and signal lines 152), and selection control logic 120. Read control logic 116 may be configured to determine whether data for an associated incoming read operation is to be read from one of cache banks $114_0$-$114_4$ or one of memory banks $110_0$-$110_{11}$. Read control logic 116 may determine that the data is to be read from one of cache banks $114_0$-$114_4$ if a cache line corresponding to a location from which data is to be read from a memory bank targeted by an incoming read operation exists in one of cache banks $114_0$-$114_4$.

Read control logic 116 may be configured to determine that such a cache line exists in one of cache banks $114_0$-$114_4$ by performing a cache lookup operation on cache tag memory 112. The cache lookup operation returns a row selected from cache tag memory 112 using cache address index signals derived from the address signals received via first read port 102 or second read port 104. In an embodiment where each tag field has a corresponding valid field, read control logic 116 may determine that such a cache line exists if the tag address is equal to the value stored in one of tag fields $208_0$-$208_4$ of the selected row and the corresponding valid field $206_0$-$206_4$ of the matched tag field contains a value that indicates that the data stored in a corresponding row of a respective cache bank $114_0$-$114_4$ is valid. In an embodiment, where a valid field is not used, read control logic 116 may determine that such a cache line exists if the tag address is equal to the value stored in one of tag fields $208_0$-$208_4$ of the selected row.

Read control logic 116 may be configured to determine that such a cache line does not exist in one of cache banks $114_0$-$114_4$ if each of valid fields $206_0$-$206_4$ of the selected row does not contain a value that indicates that the tag stored in corresponding tag field $208_0$-$208_4$ is valid or the tag address is not equal to any of the values stored in each of tag fields $208_0$-$208_4$ of the selected row of cache tag memory 112.

In response to determining that such a cache line exists in one of cache banks $114_0$-$114_4$, read control logic 116 transmits a cache bank identifier that identifies the cache bank containing the cache line and asserts a control signal via signal lines 158 (if the incoming read operation was received via first read port 102) or signal lines 160 (if the incoming read operation was received via second read port 104). In response to determining that such a cache line does not exist in one of cache banks $114_0$-$114_4$, read control logic 116 de-asserts the control signal on signal line 158 (if the incoming read operation was received via first read port 102) or de-asserts the control signal on signal line 160 (if the incoming read operation was received via second read port 104).

Selection control logic 120 may be configured to determine whether to assert a cache bank select signal via one of signal lines $182_0$-$182_4$ or $184_0$-$184_4$ or memory bank select signals $126_0$-$126_{11}$ or $128_0$-$128_{11}$ using the control signal(s) received via signal lines 158 (if the incoming read operation was received via first read port 102) or signal lines 160 (if the incoming read operation was received via second read port 104). For example, if a control signal received from signal lines 158 is asserted, then selection control logic 120 determines that one of cache banks $114_0$-$114_4$ is to be read in response to receiving an incoming read operation received via first read port 102. In response, selection control logic 120 may use the cache tag identifier included in signal lines 158 to identify a cache bank from which to read data and asserts the proper cache bank select signal via one of signal lines $182_0$-$182_4$. If the control signal received from signal lines 158 is de-asserted, then selection control logic 120 determines that one of memory banks $110_0$-$110_{11}$ is to be read in response to receiving an incoming read operation received via first read port 102 and asserts the proper memory bank signal via $126_0$-$126_{11}$.

If a control signal received from signal lines 160 is asserted, then selection control logic 120 determines that one of cache banks $114_0$-$114_4$ is to be read in response to receiving an incoming read operation received via second read port 104. In response, selection control logic 120 may use the cache tag identifier included in signal lines 160 to identify a cache bank from which to read data and asserts the proper cache bank select signal via one of signal lines $184_0$-$184_4$. If the control signal received from signal lines 158 is de-asserted, then selection control logic 120 determines that one of memory banks $110_0$-$110_{11}$ is to be read in response to receiving an incoming read operation received via second read port 104 and asserts the proper memory bank signal via $128_0$-$128_{11}$.

First cache selection control logic 122 may be configured to select the cache bank from which data is read out for an incoming read operation received via first read port 102. For example, first cache selection control logic 122 uses the cache bank identifier received via signal lines 158 to select which data output signal line $162_0$-$162_4$ from among cache banks $114_0$-$114_4$ is to provide the data that is read out. The data received via the selected data output signal is provided via signal lines 166 to mux 138.

Second cache selection control logic 124 may be configured to select the cache bank from which data is read out for an incoming read operation received via second read port 104. For example, second cache selection control logic 124 uses the cache bank identifier received via signal lines 160 to select which data output signal line $164_0$-$164_4$ from among cache banks $114_0$-$114_4$ is to provide the data that is read out. The data received via the selected data output signal is provided via signal line 170 to mux 144.

Mux 138 uses the control signal received signal lines 158 to select between data read from one of cache banks $114_0$-$114_4$ (received via signal lines 166) or data read from one of memory banks $110_0$-$110_{11}$ (received via signal lines 136). For example, when the control signal received via signal lines 158 is asserted, mux 138 may output data received from one of cache banks $114_0$-$114_4$. When the control signal received via signal line 158 is de-asserted, mux 138 may output data received from one of memory banks $110_0$-$110_{11}$. Mux 138 may output the selected data via the read data signal lines of first read port 102. In one embodiment, the data output via first read port 102 is flopped in a scan test flip flop 168 to assist in debug of the QCDP memory 100 before being output via the read data signal lines of first read port 102.

Mux 144 uses the control signal received signal line 160 to select between data read from one of cache banks $114_0$-$114_4$ (received via signal lines 170) or data read from one of memory banks $110_0$-$110_{11}$ (received via signal lines 142). For example, when the control signal received via signal lines 160 is asserted, mux 144 may output data received from one of cache banks $114_0$-$114_4$. When the control signal received via signal line 160 is de-asserted, mux 144 may output data received from one of memory banks $110_0$-$110_{11}$. Mux 144 may output the selected data via the read data signal lines of second read port 104. In one embodiment, the data output via second read port 104 is flopped in a scan test flip flop 176 to assist in debug of the QCDP memory 100 before being output via the read data signal lines of second read port 104.

As previously mentioned, cache lookup operations may take one or more clock cycles. In the example implementation shown in FIG. 1, cache lookup operations take two clock cycles. Accordingly, signals received via read ports 102, 104 are delayed two clock cycles (via flip flops 178 and 180) before being received by read control logic 116 and selection control logic 120 to enable these signals to be synchronized with the tag information being received from cache tag memory 112 via signal lines 150 and 152 and signals received via read ports 102, 104 are delayed four clock cycles (via flip flops 178, 180, 183, and 185) before being received by mux 134 and mux 140. Additional details concerning the operation of read control logic 116 will be provided below in reference to FIGS. 4-5.

Write control logic 118 is coupled to first read port 102, second read port 104, first write port 106, first write port 108, cache tag memory 112 (via signal lines 154 and signal lines 156), and selection control logic 120. Write control logic 118 may be configured to determine whether an incoming write operation is blocked by at least two incoming read operations (or one incoming read operation and another incoming write operation). When determining whether an incoming write operation is blocked by two incoming read operations, write control logic 118 may be configured to determine that an incoming write operation is blocked by comparing the bank address signals of the two incoming read operations (received via first read port 102 and second read port 104) and the bank address signals of the incoming write operation (receiving via first write port 106 or second write port 108). If the bank address of an incoming write operation is the same as the bank addresses of the two incoming read operations, then write control logic 118 determines that the incoming write operation is blocked. When determining whether an incoming write operation is blocked by one incoming read operation and another incoming write operation, write control logic 118 may be configured to determine that an incoming write operation is blocked by comparing the bank address signals of the one incoming read operation (received via first read port 102 or second read port 104), the bank address signals of the other incoming write operation (received via first write port 106 or second write port 108), and the bank address signals of the incoming write operation (receiving via first write port 106 or second write port 108). In response to determining that an incoming write operation is blocked, write control logic 118 may be configured to write the data for the associated incoming write operation to one of cache banks $114_0$-$114_4$. However, in certain situations, write control logic 118 may be configured to write the data for the associated incoming write operation to one of memory banks $110_0$-$110_{11}$.

For example, write control logic 118 may write data for the associated incoming write operation to one of memory banks $110_{0-11}$ when write access to the cache bank is blocked. Write access to the cache bank may be blocked when the cache bank also contains a cache line corresponding to a location to be read from a memory bank targeted by at least one incoming read operation. In this case, data for the incoming read operation is read from one of cache banks $114_0$-$114_4$ instead of the target memory bank. As a result, a port of the target memory bank that would normally be occupied by the incoming read operation is now available for the incoming write operation to write data.

When writing data to one of cache banks $114_0$-$114_4$, write control logic 118 first determines whether a cache line corresponding to a location to be written to in a memory bank targeted by the incoming write operation exists in one of cache banks $114_0$-$114_4$. Write control logic 118 may determine that such a cache line exists in one of cache banks $114_0$-$114_4$ by performing a cache lookup operation on cache tag memory 112. The cache lookup operation returns a row selected from cache tag memory 112 using cache address index signals derived from the address signals received via first write port 106 or second write port 108. In an embodiment where each tag field has a corresponding valid field, write control logic 118 may determine that such a cache line exists if the tag address is equal to the value stored in one of tag fields $208_0$-$208_4$ of the selected row and the corresponding valid field $206_0$-$206_4$ of the matched tag field contains a value that indicates that the data stored in a corresponding row of a respective cache bank $114_0$-$114_4$ is valid. In an embodiment, where a valid field is not used, write control logic 118 may determine that such a cache line exists if the tag address is equal to the value stored in one of tag fields $208_0$-$208_4$ of the selected row.

Write control logic 118 may be configured to determine that such a cache line does not exist in one of cache banks $114_0$-$114_4$ if each of valid fields $206_0$-$206_4$ of the selected row does not contain a value that indicates that the tag stored in corresponding tag field $208_0$-$208_4$ is valid or the tag address is not equal to any of the value stored in each of tag fields $208_0$-$208_4$ of the selected row of cache tag memory 112.

In response to determining that such a cache line exists in one of cache banks $114_0$-$114_4$, write control logic 118 transmits a cache bank identifier that identifies the cache bank containing the cache line and asserts a control signal via signal lines 186 (if the incoming write operation was received via first write port 106) or signal lines 188 (if the incoming write operation was received via second write port 108). In response to determining that such a cache line does not exist in one of cache banks $114_0$-$114_4$, write control logic 118 de-asserts the control signal on signal line 186 (if the incoming write operation was received via first write port 106) or de-asserts the control signal on signal line 188 (if the incoming read operation was received via second write port 108).

Selection control logic 120 may be configured to determine whether to assert a cache bank select signal via one of signal lines $182_0$-$182_4$ or $184_0$-$184_4$ or memory bank select signals $126_0$-$126_{11}$ or $128_0$-$128_{11}$ using the control signal(s) received via signal lines 186 (if the incoming write operation was received via first write port 106) or signal lines 188 (if the incoming write operation was received via second write port 108). For example, if a control signal received from signal lines 186 is asserted, then selection control logic 120 determines that one of cache banks $114_0$-$114_4$ is to be written to in response to receiving an incoming write operation received via first write port 106. In response, selection control logic 120 may use the cache tag identifier included in signal lines 186 to identify a cache bank to which data is to be written and asserts the proper cache bank select signal via one of signal lines $182_0$-$182_4$. If the control signal received from signal lines 186 is de-asserted, then selection control logic 120 determines that one of memory banks $110_0$-$110_{11}$ is to be written in response to receiving an incoming write operation received via first write port 106 and asserts the proper memory bank signal via $126_0$-$126_{11}$.

If a control signal received from signal lines 188 is asserted, then selection control logic 120 determines that one of cache banks $114_0$-$114_4$ is to be written to in response to receiving an incoming write operation received via second write port 106. In response, selection control logic 120 may use the cache tag identifier included in signal lines 188 to identify a cache bank to which data is to be written and asserts the proper cache bank select signal via one of signal lines $184_0$-$184_4$. If the control signal received from signal lines 188 is de-asserted, then selection control logic 120 determines that one of memory banks $110_0$-$110_{11}$ is to be written to in response to receiving an incoming write operation received via second write port 108 and asserts the proper memory bank signal via $128_0$-$128_{11}$.

First cache selection control logic 122 may be configured to select the cache bank that contains the data to be written to memory banks $110_0$-$110_{11}$ in response to receiving a write operation via first write port 106. For example, first cache selection control logic 122 uses the cache bank identifier received via signal lines 186 to select which data output signal line $162_0$-$162_4$ from among cache banks $114_0$-$114_4$ is to provide the data to be written to memory banks $110_0$-$110_{11}$. The data received via the selected data output signal is provided via a signal line 166 to mux 190.

Second cache selection control logic 124 may be configured to select the cache bank that contains the data to be written to memory banks $110_0$-$110_{11}$ in response to receiving a write operation via second write port 108. For example, second cache selection control logic 124 uses the cache bank identifier received via signal lines 188 to select which data output signal line $164_0$-$164_4$ from among cache banks $114_0$-$114_4$ is to provide the data to be written to memory banks $110_0$-$110_{11}$. The data received via the selected data output signal is provided via a signal line 170 to mux 192.

Mux 190 uses the control signal received via signal lines 186 to select the data to be written to memory banks $110_0$-$110_{11}$ in response to receiving an incoming write operation via first write port 106. Mux 190 selects between data received from one of cache banks $114_0$-$114_4$ via signal lines 166 for write data received via first write port 106. For example, when the control signal received via signal lines 186 is asserted, mux 190 outputs the data received from one of cache banks $114_0$-$114_4$. When the control signal received via signal lines 186 is de-asserted, mux 190 outputs the write data received via first write port 106. The selected write data is output from mux 190 via signal lines 194.

Mux 192 uses the control signal received via signal lines 188 to select the data to be written to memory banks $110_0$-$110_{11}$ in response to receiving an incoming write operation via second write port 108. Mux 192 selects between data received from one of cache banks $114_0$-$114_4$ via signal lines 170 for write data received via second write port 108. For example, when the control signal received via signal lines 188 is asserted, mux 192 outputs the data received from one of cache banks $114_0$-$114_4$. When the control signal received via signal lines 188 is de-asserted, mux 192 outputs the write data received via second write port 108. The selected write data is output from mux 192 via signal lines 196.

In one embodiment, when writing data to a cache line of one of cache banks $114_0$-$114_4$, write control logic 118 may be configured to preserve the data stored in the cache line of the cache bank to be written (if such data exists) by writing the data stored therein to the memory bank indicated in the corresponding tag field of the cache line (as described below with reference to step 636 of FIG. 6C and step 736 of FIG. 7C). Write control logic 118 may perform this operation by transmitting a cache bank identifier that identifies the cache bank containing the cache line and asserting a control signal on signal line 186 (if the incoming write operation was received via first write port 106) or by transmitting the cache bank identifier and asserting a control signal on signal line 188 (if the incoming write operation was received via second write port 108).

Once the data has been preserved (i.e., written to the target memory bank), write control logic 118 provides the write data associated with the blocked incoming write operation and the cache bank identifier to selection control logic 120 (e.g., via signal lines 186 if the blocked incoming write operation was received via first write port 106 or signal lines 188 if the blocked incoming write operation was received via second write port 108) and selection control logic 120 writes the data associated with the blocked incoming write operation into the cache bank identified by the cache bank identifier.

In another embodiment, write control logic 118 may be configured to overwrite the data stored in a cache line of a cache bank to be written (without preserving it in one of memory banks $110_0$-$111_{11}$) with the data associated with the blocked incoming write operation (as described below with reference to steps 612, 624, and 634 of FIGS. 6A-6C and step 712, 724, and 734 of FIGS. 7A-7C.

In response to determining that an incoming write operation is not blocked by at least two incoming read operations (or one incoming read operation and another incoming write operation), write control logic 118 may be configured to write data for the incoming write operation to the target memory bank specified by the incoming write operation. Write control logic 118 may perform this operation for an incoming write operation received via first write port 106 by de-asserting the control signal transmitted via signal lines 186, thereby enabling mux 190 to output write data received via first write port 106. Write control logic 118 may perform this operation for an incoming write operation received via second write port 108 by de-asserting the control signal transmitted via signal lines 188, thereby enabling mux 192 to output write data received via second write port 108. Write control logic 118 determines the target memory bank using bank address signals received via first write port 106 or second write port 108.

As previously mentioned, cache lookup operations to cache tag memory 112 may take one or more clock cycles. In addition, read and/or write operations to cache banks $114_0$-$114_4$ may also take one or more clock cycles. In the example implementation shown in FIG. 1, cache lookup operations to cache tag memory 112 and read and write operations to cache banks $114_0$-$114_4$ each take two clock cycles. Accordingly, signals received via write ports 106, 108 are delayed two clock cycles (via flip flops 195, 197) before being received by write control logic 118 to enable these signals to be synchronized with the tags being received from cache tag memory 112 via signal lines 154 and 156 and signals received via write ports 106, 108 are delayed four clock cycles (via flip flops 195, 197, 198, and 199) before being received by mux 190 and mux 192. Additional details concerning the operation of write control logic 118 will be provided below in reference to FIGS. 6A-7C.

Selection control logic 120 may be further configured to receive data via signal lines 194 and signal lines 196. Selection control logic 120 may also be configured to receive control signals via signal lines 186 and signal lines 188. Upon receiving a control signal via signal line 186, selection control logic 120 may be configured to utilize the control signal to determine whether the write data received via signal lines 194 is to be written to one of cache banks $114_0$-$114_4$ or one of memory banks $110_0$-$110_{11}$. For example, if the control signal on signal line 186 is asserted, then selection control logic 120 may be configured to determine that write data received via signal lines 194 is to be written to one of cache banks $114_0$-$114_4$. In response, selection control logic 120 may use the cache tag identifier included in signal lines 186 to identify a cache bank to which the write data is to be written and assert the proper cache bank select signal via one of signal lines $182_0$-$182_4$. If the control signal received via signal lines 186 is de-asserted, then selection control logic 120 may be configured to determine that write data received via signal lines 194 is to be written to one of memory banks $110_0$-$110_{11}$. In response, selection control logic 120 may use the bank address signals received from first write port 106 to identify the memory bank to which the write data is to be written and asserts the proper bank select signal via one of signal lines $126_0$-$126_{11}$.

Upon receiving a control signal via signal line 188, selection control logic 120 may be configured to utilize the control signal to determine whether the write data received via signal lines 196 is to be written to one of cache banks $114_0$-$114_4$ or one of memory banks $110_0$-$110_{11}$. For example, if the control signal on signal line 188 is asserted, then selection control logic 120 may be configured to determine that write data received via signal lines 196 is to be written to one of cache banks $114_0$-$114_4$. In response, selection control logic 120 may use the cache tag identifier included in signal lines 188 to identify a cache bank to which the write data is to be written and assert the proper cache bank select signal via one of signal lines $184_0$-$184_4$. If the control signal received via signal lines 188 is de-asserted, then selection control logic 120 may be configured to determine that write data received via signal lines 196 is to be written to one of memory banks $110_0$-$110_{11}$. In response, selection control logic 120 may use the bank address signals received from second write port 108 to identify the memory bank to which the write data is to be written and asserts the proper bank select signal via one of signal lines $128_0$-$128_{11}$.

It is noted that while the embodiments described above describe that an incoming write operation may be blocked by two incoming read operations (or one incoming read operation and another incoming write operation), in one embodiment, an incoming write operation may be blocked by a single incoming read operation that is received during the same clock cycle as the incoming write operation.

Figure 3:
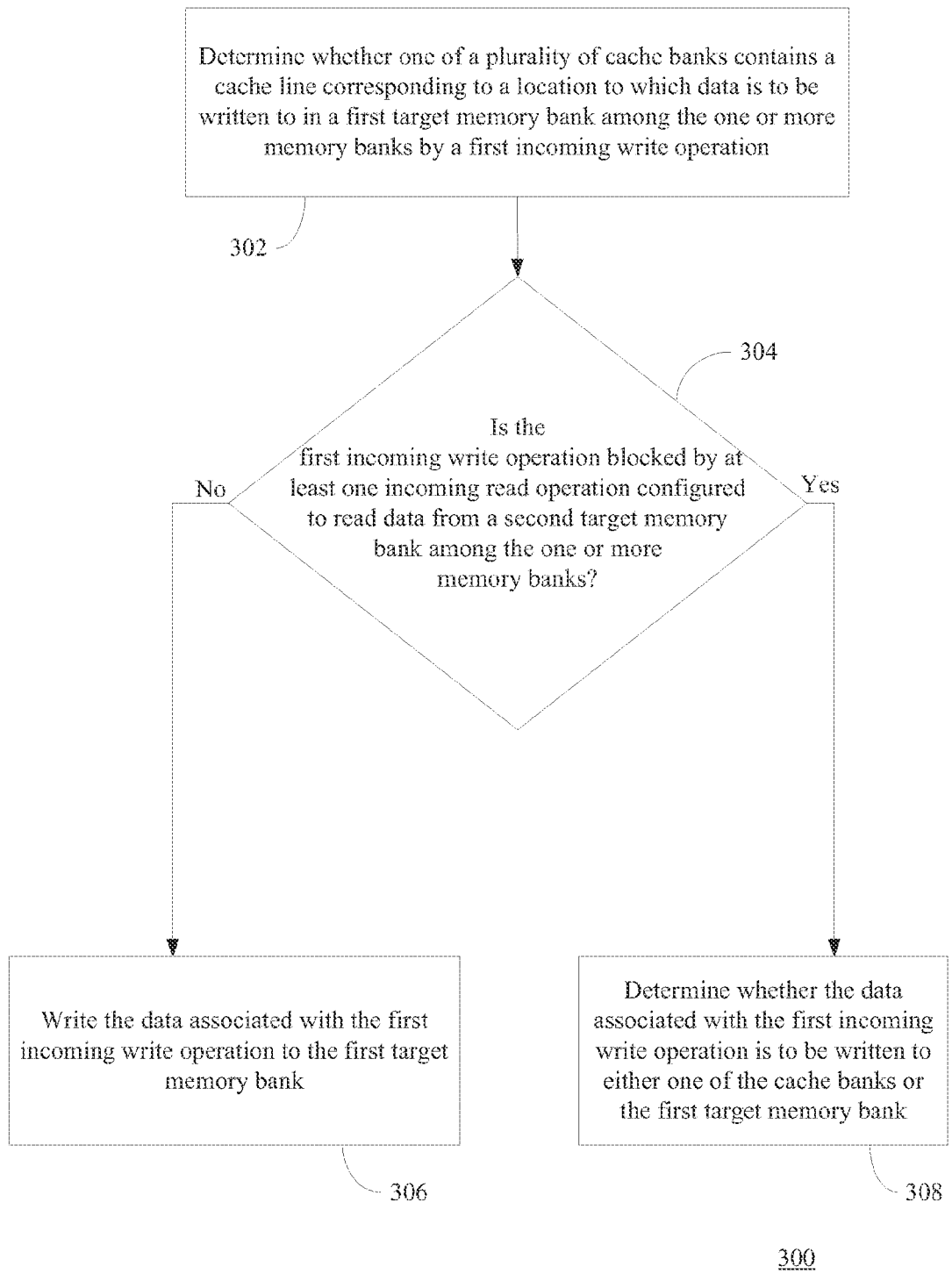
FIG. 3 depicts a flowchart of an example method for determining whether write data is to be written to one of a plurality of cache banks or to one of one or more memory banks in accordance with an embodiment.

FIG. 3 depicts a flowchart 300 of an example method for determining whether write data is to be written to a cache bank, such as one of cache banks $114_0$-$114_4$, or one of one or more memory banks, such as memory banks $110_0$-$110_{11}$, in accordance with an embodiment. The method of flowchart 300 will now be described with continued reference to example QCDP memory 100 of FIG. 1, although the method is not limited to that implementation.

As shown in FIG. 3, the method of flowchart 300 begins at step 302, in which write control logic 118 determines that one of cache banks $114_0$-$114_4$ contains a cache line corresponding to a location to which data is to be written to in a first target memory bank among the one or more memory banks $110_0$-$110_{11}$ by a first incoming write operation. Write control logic 118 may determine that one of cache banks $114_0$-$114_4$ contains such a cache line by performing a cache lookup operation on a cache tag memory, such as cache tag memory 112.

At step 304, write control logic 118 determines whether the first incoming write operation is blocked by at least one incoming read operation configured to read data from a second target memory bank among one or more memory banks $110_0$-$110_{11}$. Write control logic 118 may determine that the first incoming write operation is blocked by the at least one incoming read operation if at least the first target memory bank and the second target memory bank are the same. If write logic 125 determines that the first incoming write operation is blocked, then flow continues to step 306. Otherwise, flow continues to step 304.

In the example embodiment shown in FIG. 1, write control logic 118 may determine that an incoming write operation is blocked by at least two incoming read operations (or one incoming read operation and another incoming write operation) if the target memory bank associated with the incoming write operation and the target memory banks associated with the at least two incoming read operations (or the one incoming read operation and the other incoming write operation) are the same.

At step 306, the data associated with the first incoming write operation is written to the first target memory bank in response to write control logic 118 determining that the first incoming write operation is not blocked by the at least one incoming read operation.

At step 308, write control logic 118 determines whether the data associated with the first incoming write operation is written to either one of cache banks $114_0$-$114_4$ or the first target memory bank in response to write control logic 118 determining that the first incoming write operation is blocked by the at least one incoming read operation.

Figure 4:
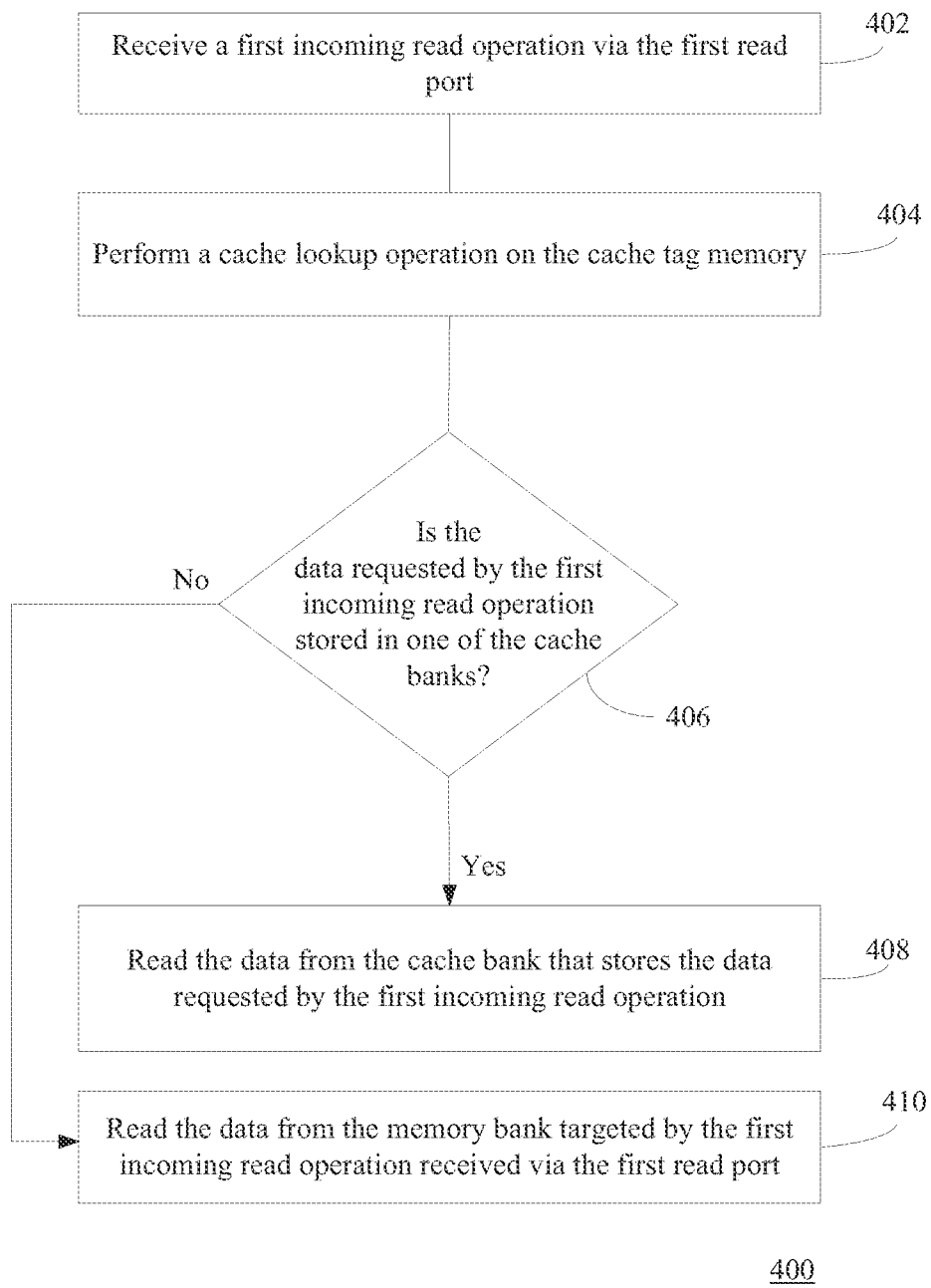
FIG. 4 depicts a flowchart of an example method performed by read control logic in a memory in response to receiving an incoming read operation via a first read port in accordance with an embodiment.

FIG. 4 depicts a flowchart 400 of an example method that may be performed by read control logic 116 in response to receiving an incoming read operation via first read port 102. The method of flowchart 400 will now be described with continued reference to QCDP memory 100 of FIG. 1, although the method is not limited to that implementation.

As shown in FIG. 4, the method of flowchart 400 begins at step 402, in which QCDP memory 100 receives a first incoming read operation via first read port 102.

At step 404, read control logic 116 performs a cache lookup operation on cache tag memory 112. In response, read control logic 116 receives information located at a row of cache tag memory 112 selected using cache address index signals received via first read port 102. The information may include a plurality of tags stored in a plurality of tag fields $208_0$-$208_4$ that each correspond to one of cache banks $114_0$-$114_4$ and a plurality of values stored in a plurality of valid fields $206_0$-$206_4$ that indicate whether each of cache banks $114_0$-$114_4$ contains valid data at the location corresponding to the cache address index.

At step 406, read control logic 116 determines whether the data requested by the first incoming read operation is stored in one of cache banks $114_0$-$114_4$. Read control logic 116 makes this determination by determining whether any of the cache banks $114_0$-$114_4$ contains a cache line that corresponds to a location from which data is to be read from a memory bank targeted by the first incoming read operation. In an embodiment where each tag field has a corresponding tag field, read control logic 116 may determine that one of cache banks $114_0$-$114_4$ contains such a cache line by determining that a value stored in one of tag fields $208_0$-$208_4$ is equal to the tag address received via first read port 102 and the corresponding valid field $206_0$-$206_4$ for the matched tag field contains a value that indicates that the data stored in a corresponding row of the respective cache bank $114_0$-$114_4$ is valid. In an embodiment, where a valid field is not used, read control logic 116 may determine that such a cache line exists if the value stored in one of tag fields $208_0$-$208_4$ is equal to the tag address received via first read port 102.

Read control logic 116 may determine that none of these cache lines contains such a cache line by determining that each value stored in each of the tag fields $208_0$-$208_4$ is not equal to the tag address received via second read port 104 and/or each corresponding valid field $206_0$-$206_4$ for each tag field $208_0$-$208_4$ contains a value that indicates that data stored in a corresponding row of the respective cache bank $114_0$-$114_4$ is not valid. If read control logic 116 determines that the data requested by the first incoming read operation is stored one of cache banks $114_0$-$114_4$, flow continues to step 408. Otherwise, flow continues to step 410.

At step 408, the data is read from the cache bank that stores the data requested by the first incoming read operation in response to determining that the data requested by the first incoming read operation is stored in one of cache banks $114_0$-$114_4$.

At step 410, the data is read from the memory bank targeted by the first incoming read operation (i.e., one of memory banks $110_0$-$110_{11}$) received via the first read port 102 in response to determining that the data requested by the first incoming read operation is not stored in any of cache banks $114_0$-$114_4$.

Figure 5:
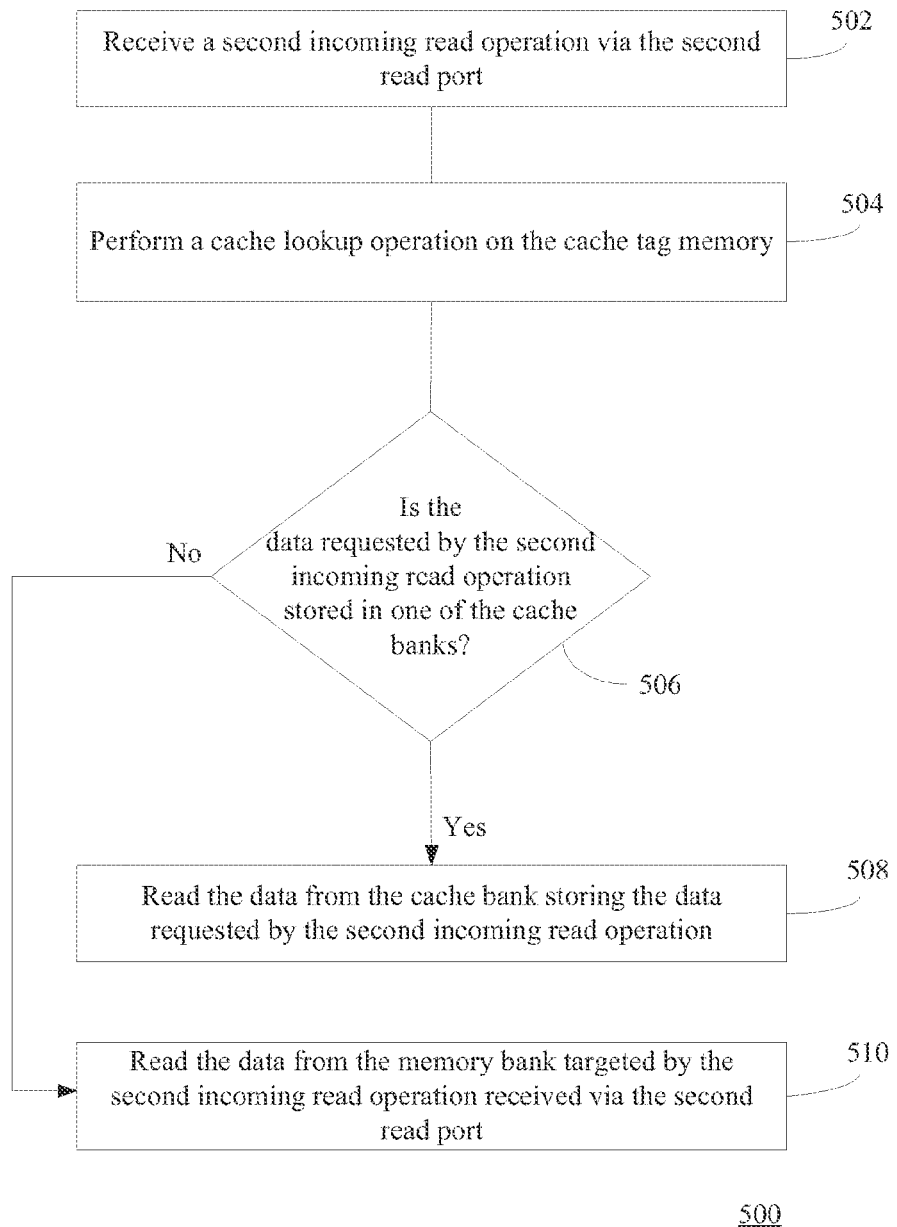
FIG. 5 depicts a flowchart of an example method performed by read control logic in a memory in response to receiving an incoming read operation via a second read port in accordance with an embodiment.

FIG. 5 depicts a flowchart 500 of an example method that may be performed by read control logic 116 in response to receiving an incoming read operation via second read port 104. The method of flowchart 500 will now be described with continued reference to QCDP memory 100 of FIG. 1, although the method is not limited to that implementation.

As shown in FIG. 5, the method of flowchart 500 begins at step 502, in which QCDP memory 100 receives a second incoming read operation via second read port 104.

At step 504, read control logic 116 performs a cache lookup operation on cache tag memory 112. In response, read control logic 116 receives information located at a row of cache tag memory 112 selected using cache address index signals received via second read port 104. The information may include a plurality of tags stored in a plurality of tag fields $208_0$-$208_4$ that each correspond to one of cache banks $114_0$-$114_4$ and a plurality of values stored in a plurality of valid fields $206_0$-$206_4$ that indicate whether each of cache banks $114_0$-$114_4$ contains valid data at the location corresponding to the cache address index.

At step 406, read control logic 116 determines whether the data requested by the second incoming read operation is stored in one of cache banks $114_0$-$114_4$. Read control logic 116 makes this determination by determining whether any of the cache banks $114_0$-$114_4$ contains a cache line that corresponds to a location from which data is to be read from a memory bank targeted by the second incoming read operation. In an embodiment where each tag field has a corresponding tag field, read control logic 116 may determine that one of cache banks $114_0$-$114_4$ contains such a cache line by determining that a value stored in one of tag fields $208_0$-$208_4$ is equal to the tag address received via second read port 104 and the corresponding valid field $206_0$-$206_4$ for the matched tag field contains a value that indicates that the data stored in a corresponding row of the respective cache bank $114_0$-$114_4$ is valid. In an embodiment, where a valid field is not used, read control logic 116 may determine that such a cache line exists if the value stored in one tag fields $208_0$-$208_4$ is equal to the tag address received via second read port 104.

Read control logic 116 may determine that none of these cache lines contains such a cache line by determining that each value stored in each of the tag fields $208_0$-$208_4$ is not equal to the tag address received via second read port 104 and/or each corresponding valid field $206_0$-$206_4$ for each tag field $208_0$-$208_4$ contains a value that indicates that data stored in a corresponding row of the respective cache bank $114_0$-$114_4$ is not valid. If read control logic 116 determines that the data requested by the second incoming read operation is stored one of cache banks $114_0$-$114_4$, flow continues to step 508. Otherwise, flow continues to step 510.

At step 508, the data is read from the cache bank that stores the data requested by the second incoming read operation in response to determining that the data requested by the second incoming read operation is stored in one of cache banks $114_0$-$114_4$.

At step 510, the data is read from the memory bank targeted by the second incoming read operation (i.e., one of memory banks $110_0$-$110_{11}$) received via the second read port 104 in response to determining that the data requested by the second incoming read operation is not stored in any of cache banks $114_0$-$114_4$.

Figure 6A:
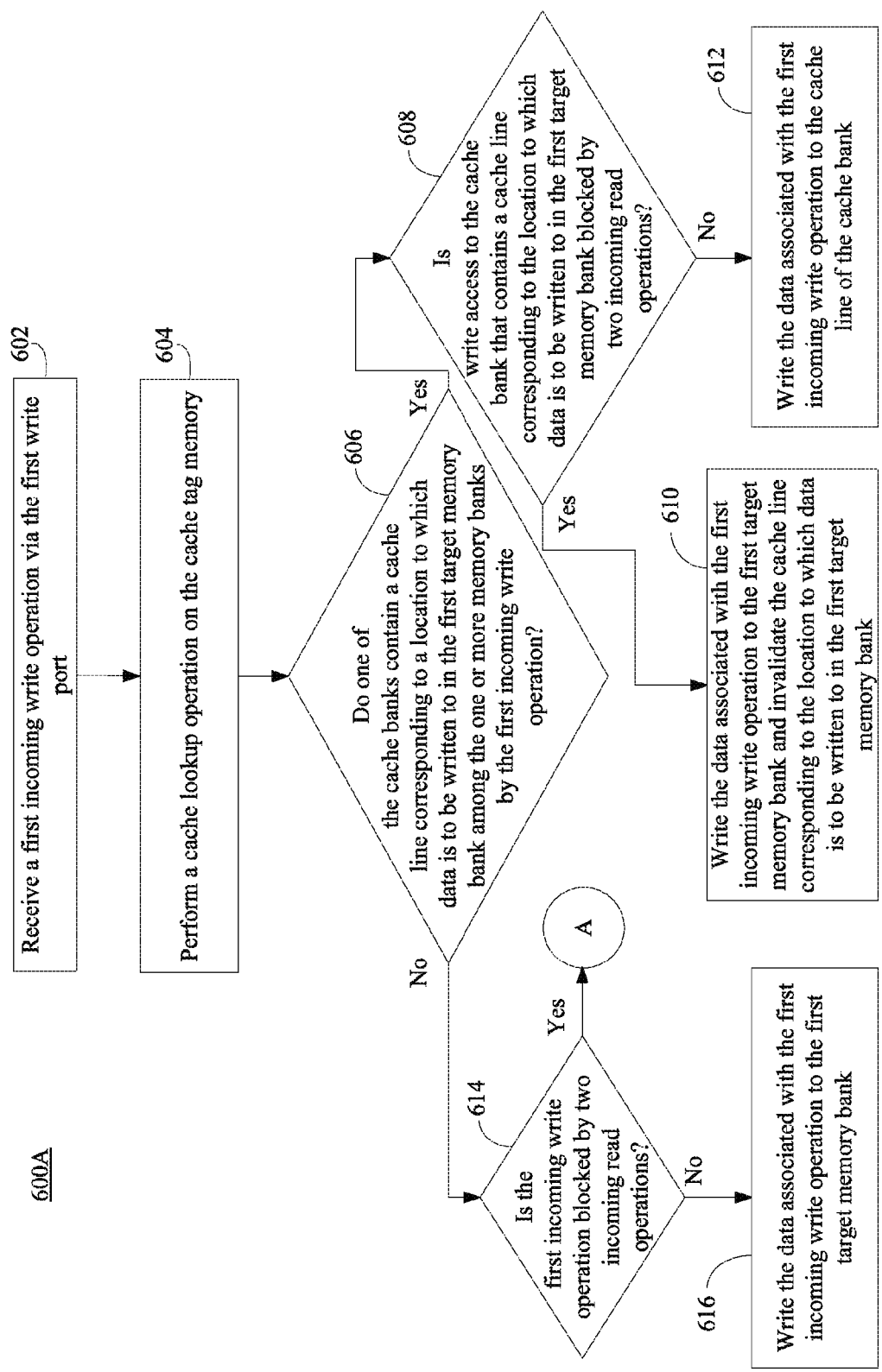
FIGS. 6A-6C depict flowcharts that collectively represent an example method performed by write control logic in a memory in response to receiving a first incoming write operation configured to write data to a first target memory bank via a first write port in accordance with an embodiment.
Figure 6B:
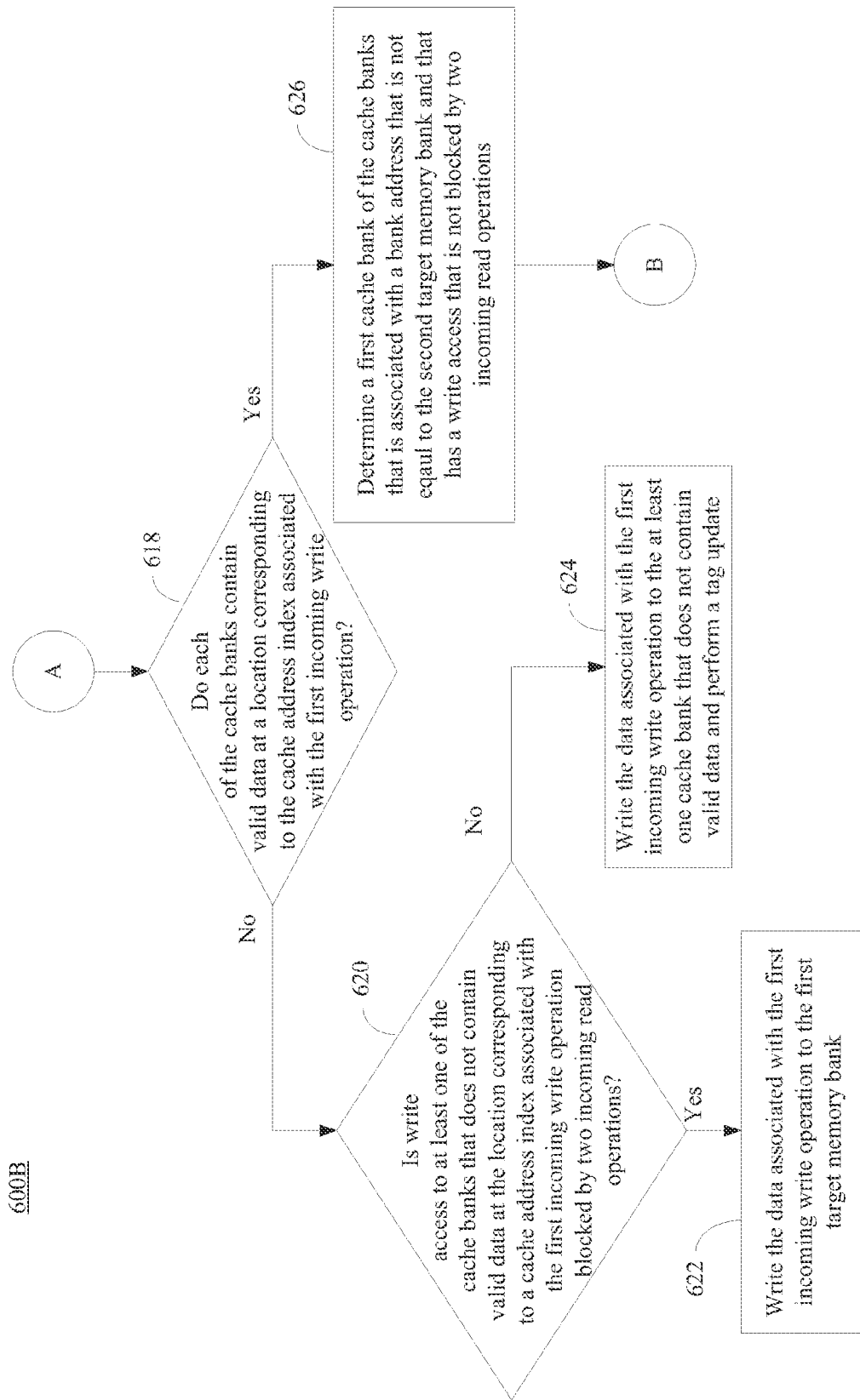
Figure 6C:
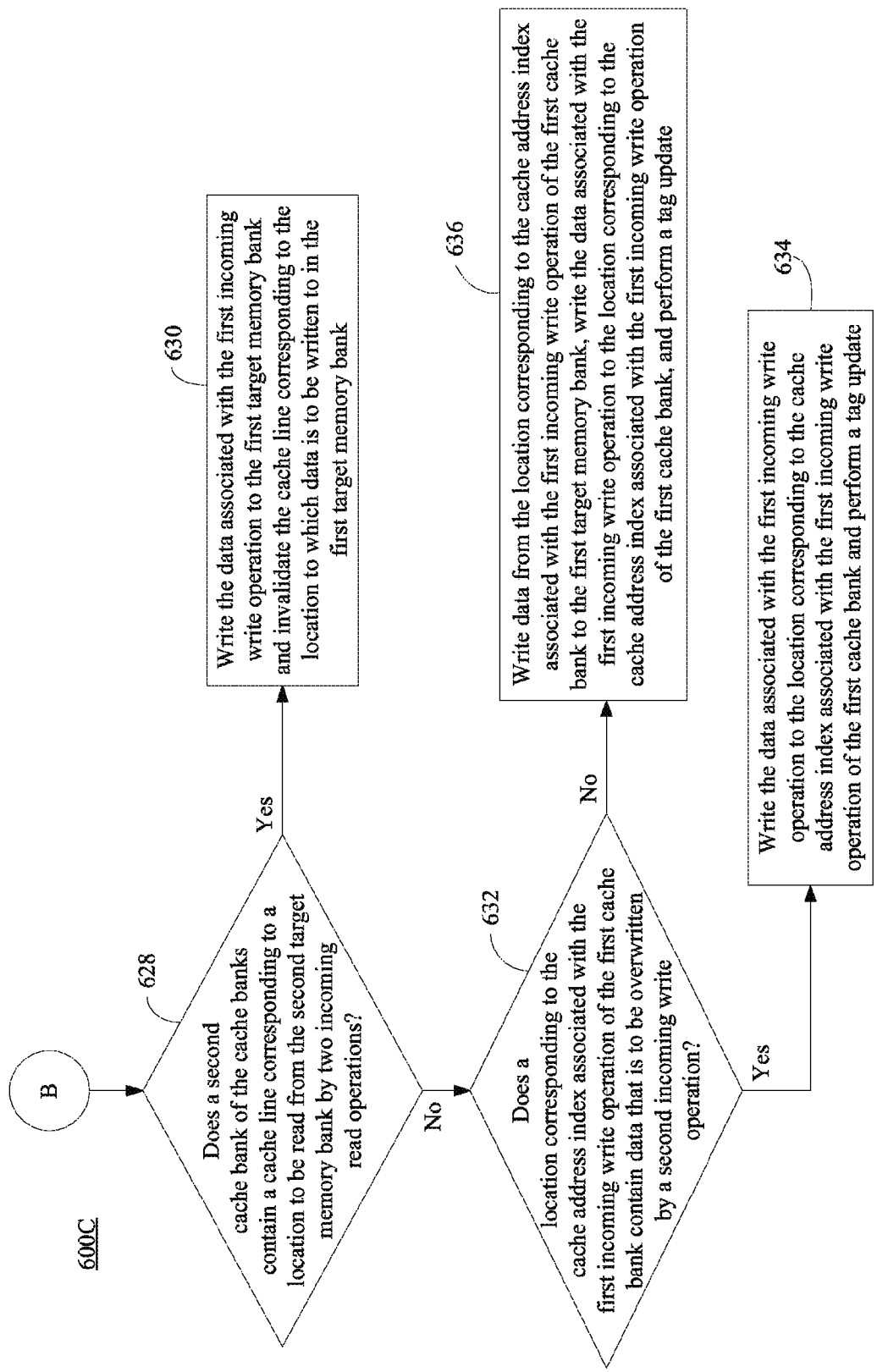

FIG. 6A-6C depict flowcharts 600A, 600B, and 600C that collectively represent of an example method that may be performed by write control logic 118 in response to QCDP memory 100 receiving a first incoming write operation configured to write data to a first target memory bank via first write port 106. The method of flowcharts 600A, 600B, and 600C will now be described with continued reference to QCDP memory 100 of FIG. 1, although the method is not limited to that implementation.

As shown in FIG. 6A, the method of flowchart 600 begins at step 602, in which QCDP memory 100 receives a first incoming write operation via first write port 106.

At step 604, write control logic 118 performs a cache lookup operation on cache tag memory 112. In response, write control logic 118 receives information located at a row of cache tag memory 112 selected using cache address index signals associated with the first incoming write operation received via first write port 106. The information may include a plurality of tags stored in a plurality of tag fields $208_0$-$208_4$ that each correspond to one of cache banks $114_0$-$114_4$ and a plurality of values stored in a plurality of valid fields $206_0$-$206_4$ that indicate whether each of cache banks $114_0$-$114_4$ contains valid data at the location corresponding to the cache address index.

At step 606, write control logic 118 determines whether one of cache banks $114_0$-$114_4$ contain a cache line corresponding to a location to which data is to be written to in the first target memory bank among the one or more memory banks by the first incoming write operation. In an embodiment where each tag field has a corresponding valid field, write control logic 118 may determine that one of cache banks $114_0$-$114_4$ contains such a cache line by determining that a value stored in one of the received tag fields $208_0$-$208_4$ contains a value equal to the tag address received via first write port 106 and the corresponding valid field $206_0$-$206_4$ for the matched tag field contains a value that indicates that the data stored in a corresponding row of the respective cache bank $114_0$-$114_4$ is valid. In an embodiment, where a valid field is not used, write control logic 118 may determine that one of cache banks $114_0$-$114_4$ contains such a cache line by determining that the value stored in one of the received tag fields $208_0$-$208_4$ contains a value equal to the tag address received via first write port 106.

Write control logic 118 may determine that none of these cache banks contains such a cache line by determining that each value stored in each of tag fields $208_0$-$208_4$ is not equal to the tag address received via first write port 106 and/or each corresponding valid field $206_0$-$206_4$ for each tag field $208_0$-$208_4$ contains a value that indicates that data stored in a corresponding row of the respective cache bank $114_0$-$114_4$ is not valid. If write control logic 118 determines that one of cache banks $114_0$-$114_4$ contains a cache line corresponding to a location to which data is to be written to in the first target memory bank by the first incoming write operation, flow continues to step 608. Otherwise, flow continues to step 614.

At step 608, write control logic 118 determines whether write access to the cache bank that contains a cache line corresponding to the location to which data is to be written to in the first target memory bank is blocked by at least two incoming read operations. Write access to the cache bank may be blocked when the cache bank contains a cache line corresponding to a location to be read from a memory bank targeted by the first incoming read operation and a cache line corresponding to a location to be read from a memory bank targeted by the second incoming read operation. In one embodiment, the cache line corresponding to a location to be read from the memory bank targeted by the first incoming read operation and the cache line corresponding to the location to be read from the memory bank targeted by the second incoming read operation are the same. If write control logic 118 determines that write access to the cache bank is blocked by at least two incoming read operations, flow continues to step 610. Otherwise, flow continues to step 612.

At step 610, the write data associated with the first incoming write operation is written to the first target memory bank and the cache line corresponding to the location to which data is to be written in to in the first target memory bank is invalidated. Write control logic 118 may invalidate the cache line by performing a tag update to cache tag memory 112. The tag update may set a value stored in the corresponding valid field of cache tag memory 112 to '0' (or some other value that indicates that the cache line is invalid) and/or sets the value stored in the corresponding tag field of cache tag memory 112 to a value that is not used to represent memory banks $110_0$-$110_{11}$ (e.g., 0×C, 0×D, 0×E, or 0×F).

At step 612, the write data associated with the first incoming write operation is written to the cache line contained in the cache bank.

At step 614, write control logic 118 determines whether the first incoming write operation is blocked by at least two incoming read operations that are received during the same clock cycle as the first incoming write operation. Write control logic 118 may determine that the first incoming write operation is blocked by the at least two incoming read operations if the first target memory bank is the same as the memory banks targeted by the at least two incoming read operations. If write control logic 118 determines that the first incoming write operation is not blocked by the at least two incoming read operations, flow continues to step 616. Otherwise, flow continues to step 618 shown in FIG. 6B.

At step 616, the write data associated with the first incoming write operation is written to the first target memory bank.

Turning now to FIG. 6B, at step 618, write control logic 118 determines whether each of cache banks $114_0$-$114_4$ contain valid data at a location corresponding to the cache address index associated with the first incoming write operation received via the first write port 106. Write control logic 118 may determine that each of cache banks $114_0$-$114_4$ contain valid data by determining that the value stored in each valid field from the row of information received from cache tag memory 112 is a '1' (or some other value that indicates that the corresponding cache line is valid) and/or by determining that the value stored in each tag field from the row of information received from cache tag memory 112 contains a value representative of one of memory banks $110_0$$110_{11}$ (i.e., 0×0-0×B). If write control logic 118 determines that each of cache banks $114_0$-$114_4$ contains valid data at a location corresponding to the cache address index associated with the first incoming write, flow continues to step 626. Otherwise, flow continues to step 620.

At step 620, in response to determining that at least one of cache banks $114_0$-$114_4$ does not contain valid data at the location corresponding to the cache address index associated with the first incoming write operation, write control logic 118 determines whether write access to the at least one cache bank is blocked by the at least two incoming read operations. Write access to the cache bank may be blocked when the cache bank contains a cache line corresponding to a location to be read from a memory bank targeted by the first incoming read operation and a cache line corresponding to a location to be read from a memory bank targeted by the second incoming read operation. In one embodiment, the cache line corresponding to a location to be read from the memory bank targeted by the first incoming read operation and the cache line corresponding to the location to be read from the memory bank targeted by the second incoming read operation are the same. If write control logic 118 determines that write access to the cache bank that does not contain valid data at the location corresponding to the cache address index associated with the first incoming write operation is blocked by the at least two incoming read operations, flow continues to step 622. Otherwise, flow continues to step 624.

At step 622, write data associated with the first incoming write operation is written to the first target memory bank in response to determining that write access to the at least one of the cache banks is blocked by the at least two incoming read operations.

At step 624, write data associated with the first incoming write operation is written to the at least one cache bank that does not contain valid data and a tag update is performed in response to determining that write access to the at least one of the cache banks is not blocked by the at least two incoming read operations. For example, the write data is written to a location within the at least one cache bank corresponding to the cache address index associated with the first incoming write operation. The tag update is performed to a row corresponding to the cache address index of cache tag memory 112. The tag update sets a value corresponding to the tag address (i.e., the upper portion of the address received via the first write port 106 that is not used as the cache address index). In one embodiment, the tag update sets a value corresponding to the memory bank targeted by the first incoming write operation in the corresponding bank address field 210 of tag field 208 and a value corresponding to the two MSBs of the address index received via first write port 106 in the MSB field 212 of tag field 208.

At step 626, a first cache bank of cache banks $114_0$-$114_4$ that is associated with a bank address that is not equal to the second target memory bank and that has a write access that is not blocked by the at least two incoming read operations is determined Write control logic 118 may determine that the first cache bank is associated with a bank address that is not equal to the second target memory bank by searching the row of information received from cache tag memory 112 for a bank address field 210 that contains a value not equal to the second target memory bank. Write control logic 118 may determine whether write access to the first cache bank is blocked by determining whether the first cache bank contains a cache line corresponding to a location to be read from a memory bank targeted by the first incoming read operation and a cache line corresponding to a location to be read from a memory bank targeted by the second incoming read operation.

Turning now to FIG. 6C, at step 628, write control logic 118 determines whether a second cache bank of cache banks $114_0$-$114_4$ contains a cache line corresponding to a location to be read from the second target memory bank by the at least two incoming read operations. If write control logic 118 determines that a second cache bank of cache banks $114_0$-$114_4$ contains a cache line corresponding to a location to be read from the second target memory bank by the at least two incoming read operations, flow continues to step 630. Otherwise, flow continues to step 632.

At step 630, write data associated with the first incoming write operation is written to the first target memory bank and the cache line corresponding to the location to which data is to be written to in the first target memory bank is invalidated in response to determining that the second cache bank contains a cache line corresponding to the location to be read from the second target memory bank by the at least two incoming read operations. In an embodiment where the first incoming write operation and the at least two incoming read operations are targeting the same memory bank, data for the at least two incoming read operation is read from the second cache bank instead of the target memory bank. As result, a port of the target memory bank that would normally be occupied by the incoming read operation is now available for the incoming write operation to write data.

Write control logic 118 may invalidate the cache line by performing a tag update to cache tag memory 112. The tag update may set a value stored in the corresponding valid field of cache tag memory 112 to '0' (or some other value that indicates that the cache line is invalid) and/or sets the value stored in the corresponding tag field of cache tag memory 112 to a value that is not used to represent memory banks $110_0$-$110_{11}$ (e.g., 0xC, 0xD, 0xE, or 0xF).

At step 632, write control logic 118 determines whether a location corresponding to the cache address index associated with the first incoming write operation of the first cache bank contains data that is to be overwritten by a second incoming write operation in response to determining that the second cache bank does not contain a cache line corresponding to the location to be read from the second target memory bank by the at least two incoming read operations. Write control logic 118 may determine that the second incoming write operation is to overwrite the data if the second incoming write operation is configured to write data to the same address (i.e., same memory bank and same address index) to which the first incoming write operation is to write data. If write control logic 118 determines that the location corresponding to the cache address index associated with the first incoming write operation of the first cache bank contains data that is to be overwritten by the second incoming write operation, flow continues to step 634. Otherwise, flow continues to step 636.

At step 634, the write data associated with the first incoming write operation is written to the location corresponding to the cache address index associated with the first incoming write operation of the first cache bank and a tag update is performed in response to determining that the location corresponding to cache address index associated with the first incoming write operation of the first cache bank contains data to be overwritten by the second incoming write operation. The tag update is performed to a row corresponding to the cache address index of cache tag memory 112. The tag update sets a value corresponding to the tag address. In one embodiment, the tag update sets a value corresponding to the memory bank targeted by the first incoming write operation in the corresponding bank address field 210 of tag field 208 and a value corresponding to the two MSBs of the address index received via first write port 106 in the MSB field 212 of tag field 208.

At step 636, the data from the location corresponding to the cache address index associated with the first incoming write operation of the first cache bank is written to the first target memory bank, the write data associated with the first incoming write operation is written to the location corresponding to the cache address index associated with the first incoming write operation of the first cache bank, and a tag update is performed in response to determining that the location corresponding to cache address index associated with the first incoming write operation of the first cache bank does not contain data to be overwritten by the second incoming write operation.

Data is written from the location corresponding to the cache address index associated with the first incoming write operation of the first cache bank to the first target memory bank because this data may be associated with a previously-blocked write operation. If the write data associated with the first incoming write operation were to overwrite this data, the data would be lost. As a result, before the write data associated with the first incoming write operation is written to the location, the data from the previously-blocked write operation is written to the target memory bank specified by the value stored in the corresponding tag field of cache tag memory 112.

The tag update is performed to a row corresponding to the cache address index of cache tag memory 112. The tag update sets a value corresponding to the tag address. In one embodiment, the tag update sets a value corresponding to the memory bank targeted by the first incoming write operation in the corresponding bank address field 210 of tag field 208 and a value corresponding to the two MSBs of the address index received via first write port 106 in the MSB field 212 of tag field 208.

Figure 7A:
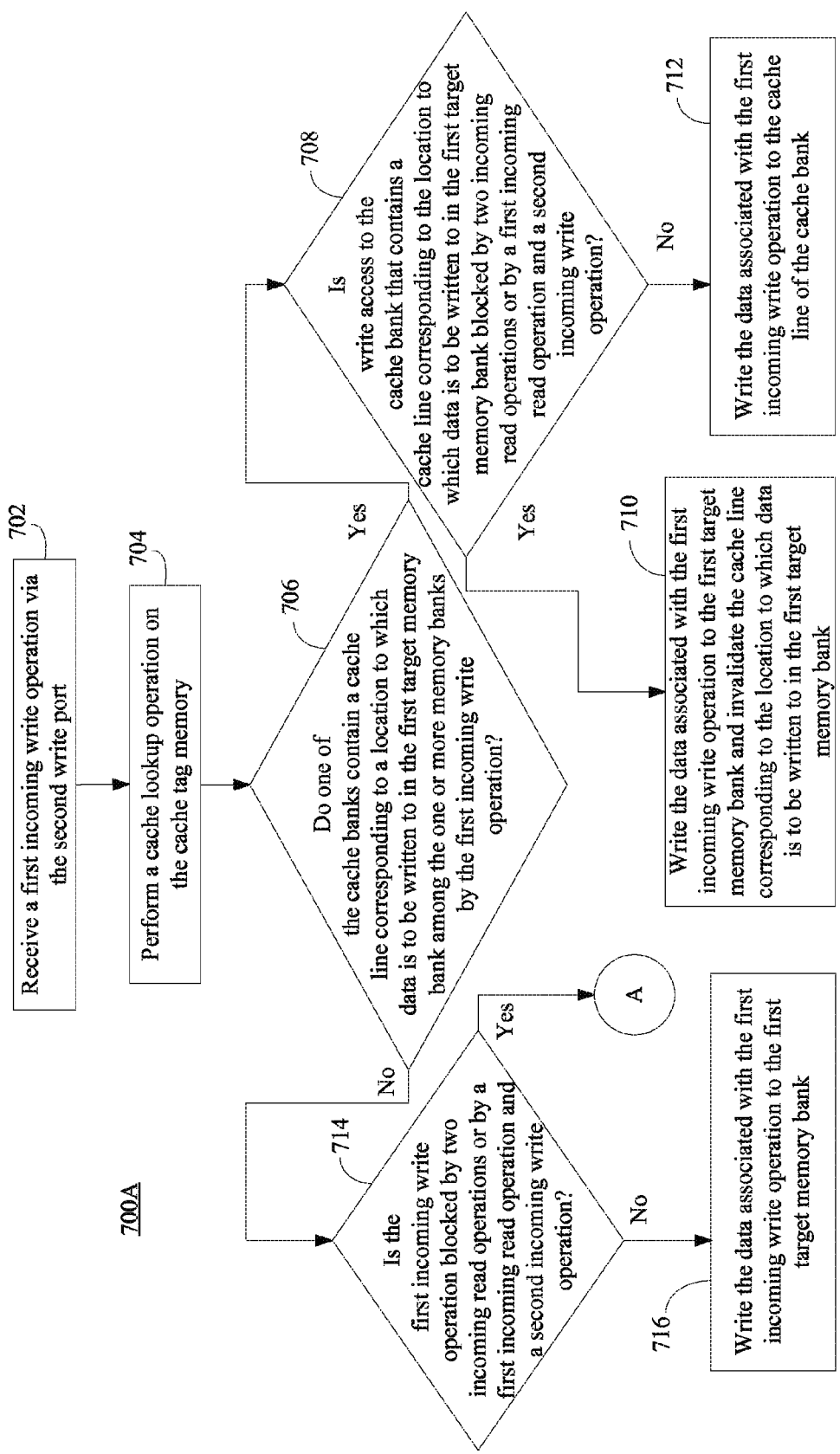
FIGS. 7A-7C depict flowcharts that collectively represent an example method performed by write control logic in a memory in response to receiving a first incoming write operation configured to write data to a first target memory bank via a second write port in accordance with an embodiment.
Figure 7B:
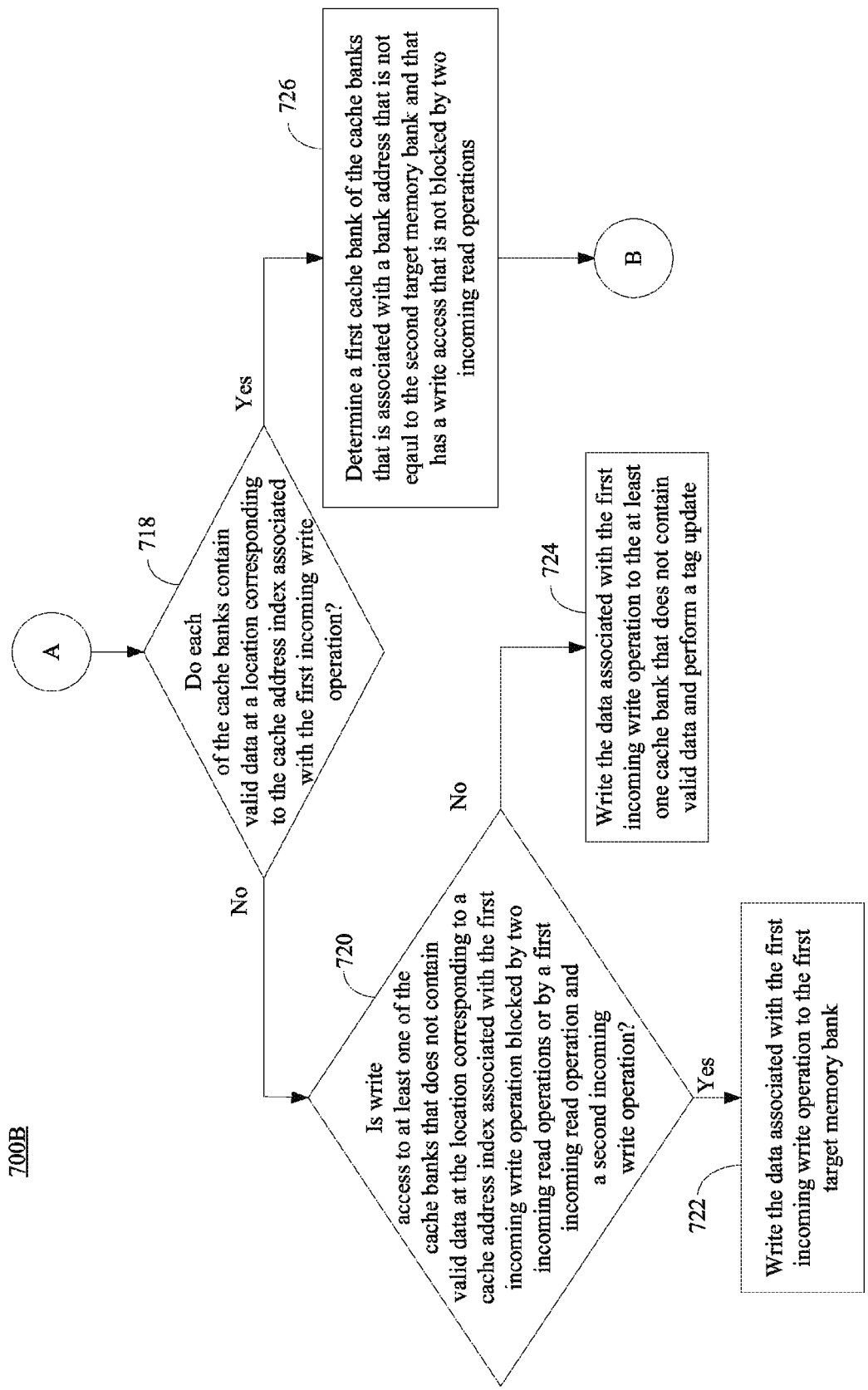
Figure 7C:
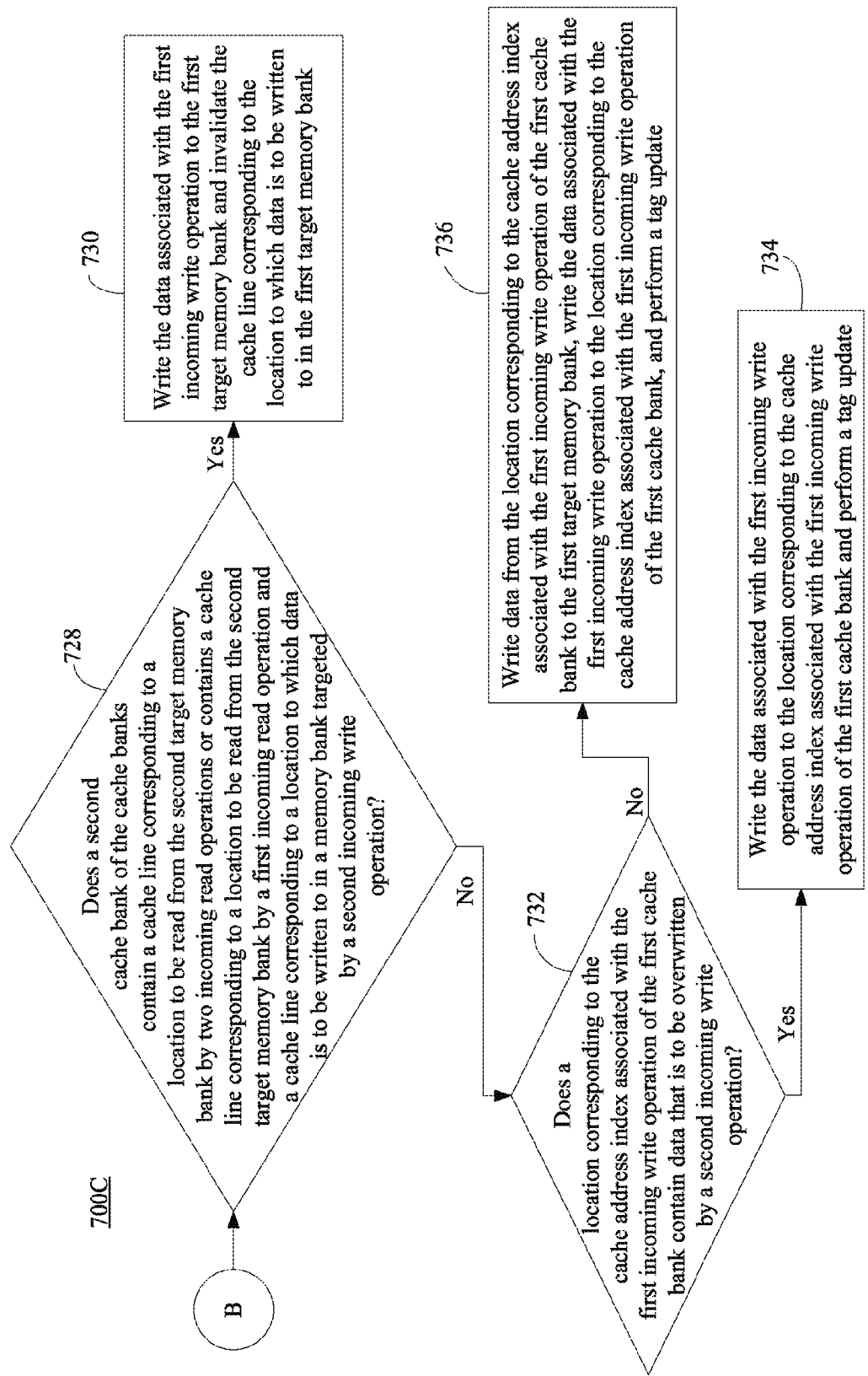

FIG. 7A-7C depict flowcharts 700A, 700B, and 700C that collectively represent of an example method that may be performed by write control logic 118 in response to QCDP memory 100 receiving a first incoming write operation configured to write data to a first target memory bank via second write port 108. The method of flowcharts 700A, 700B, and 700C will now be described with continued reference to QCDP memory 100 of FIG. 1, although the method is not limited to that implementation.

As shown in FIG. 7A, the method of flowchart 700 begins at step 702, in which QCDP memory 100 receives a first incoming write operation via second write port 108.

At step 704, write control logic 118 performs a cache lookup operation on cache tag memory 112. In response, write control logic 118 receives information located at a row of cache tag memory 112 selected using cache address index signals associated with the first incoming write operation received via second write port 108. The information may include a plurality of tags stored in a plurality of tag fields $208_0$-$208_4$ that each correspond to one of cache banks $114_0$-$114_4$ and a plurality of values stored in a plurality of valid fields $206_0$-$206_4$ that indicate whether each of cache banks $114_0$-$114_4$ contains valid data at the location corresponding to the cache address index.

At step 706, write control logic 118 determines whether one of cache banks $114_0$-$114_4$ contain a cache line corresponding to a location to which data is to be written to in the first target memory bank among the one or more memory banks by the first incoming write operation. In an embodiment where each tag field has a corresponding valid field, write control logic 118 may determine that one of cache banks $114_0$-$114_4$ contains such a cache line by determining that a value stored in one of the received tag fields $208_0$-$208_4$ contains a value equal to the tag address received via second write port 108 and the corresponding valid field $206_0$-$206_4$ for the matched tag field contains a value that indicates that the data stored in a corresponding row of the respective cache bank $114_0$-$114_4$ is valid. In an embodiment, where a valid field is not used, write control logic 118 may determine that one of cache banks $114_0$-$114_4$ contains such a cache line by determining that the value stored in one of the received tag fields $208_0$-$208_4$ contains a value equal to the tag address received via second write port 108.

Write control logic 118 may determine that none of these cache banks contains such a cache line by determining that each value stored in each of tag fields $208_0$-$208_4$ is not equal to the tag address received via second write port 108 and/or each corresponding valid field $206_0$-$206_4$ for each tag field $208_0$-$208_4$ contains a value that indicates that data stored in a corresponding row of the respective cache bank $114_0$-$114_4$ is not valid. If write control logic 118 determines that one of cache banks $114_0$-$114_4$ contains a cache line corresponding to a location to which data is to be written to in the first target memory bank by the first incoming write operation, flow continues to step 708. Otherwise, flow continues to step 714.

At step 708, write control logic 118 determines whether write access to the cache bank that contains a cache line corresponding to the location to which data is to be written to in the first target memory bank is blocked by at least two incoming read operations or by a first incoming read operation and one a second incoming write operation received via first write port 104. In the event that the first incoming write operation is blocked by at least two incoming read operations, write access to the cache bank may be blocked when the cache bank contains a cache line corresponding to a location to be read from a memory bank targeted by the first incoming read operation and a cache line corresponding to a location to be read from a memory bank targeted by the second incoming read operation. In one embodiment, the cache line corresponding to a location to be read from the memory bank targeted by the first incoming read operation and the cache line corresponding to the location to be read from the memory bank targeted by the second incoming read operation are the same.

In the event that the first incoming write operation is blocked by a first incoming read operation and a second incoming write operation, write access to the cache bank may be blocked when the cache bank contains a cache line corresponding to a location to be read from a memory bank targeted by the first incoming read operation and a cache line corresponding to a location to which data is to be written to in a memory bank targeted by the second incoming write operation. In one embodiment, the cache line corresponding to a location to be read from the memory bank targeted by the first incoming read operation and the cache line corresponding to the location to which data is to be written to in a memory bank targeted by the second incoming write operation are the same.

If write control logic 118 determines that write access to the cache bank is blocked in either case, flow continues to step 710. Otherwise, flow continues to step 712.

At step 710, the write data associated with the first incoming write operation is written to the first target memory bank and the cache line corresponding to the location to which data is to be written in to in the first target memory bank is invalidated. Write control logic 118 may invalidate the cache line by performing a tag update to cache tag memory 112. The tag update may set a value stored in the corresponding valid field of cache tag memory 112 to '0' (or some other value that indicates that the cache line is invalid) and/or sets the value stored in the corresponding tag field of cache tag memory 112 to a value that is not used to represent memory banks $110_0$-$110_{11}$ (e.g., 0xC, 0xD, 0xE, or 0xF).

At step 712, the write data associated with the first incoming write operation is written to the cache line contained in the cache bank.

At step 714, write control logic 118 determines whether the first incoming write operation is blocked by at least two incoming read operations or by a first incoming read operation and a second incoming write operation received via first write port 106 that are received during the same clock cycle as the first incoming write operation. In the event that the first incoming write operation is blocked by at least two incoming read operations, write control logic 118 may determine that the first incoming write operation is blocked if the first target memory bank is the same as the memory banks targeted by the at least two incoming read operations. In the event that the first incoming write operation is blocked if the first target memory bank is the same as the memory banks targeted by the first incoming read operation and the second incoming write operation.

If write control logic 118 determines that the first incoming write operation is not blocked in either case, flow continues to step 716. Otherwise, flow continues to step 718 shown in FIG. 7B.

At step 716, the write data associated with the first incoming write operation is written to the first target memory bank.

Turning now to FIG. 7B, at step 718, write control logic 118 determines whether each of cache banks $114_0$-$114_4$ contain valid data at a location corresponding to the cache address index associated with the first incoming write operation received via the second write port 108. Write control logic 118 may determine that each of cache banks $114_0$-$114_4$ contain valid data by determining that the value stored in each valid field from the row of information received from cache tag memory 112 is a '1' (or some other value that indicates that the corresponding cache line is valid) and/or by determining that the value stored in each tag field from the row of information received from cache tag memory 112 contains a value representative of one of memory banks $110_0$-$110_{11}$ (i.e., 0×0-0×B). If write control logic 118 determines that each of cache banks $114_0$-$114_4$ contains valid data at a location corresponding to the cache address index associated with the first incoming write, flow continues to step 726. Otherwise, flow continues to step 720.

At step 720, in response to determining that at least one of cache banks $114_0$-$114_4$ does not contain valid data at the location corresponding to the cache address index associated with the first incoming write operation, write control logic 118 determines whether write access to the at least one cache bank is blocked by at least two incoming read operations or by a first incoming read operation and a second incoming write operation received via first write port 106. Write access to the cache bank may be blocked by two incoming read operations when the cache bank contains a cache line corresponding to a location to be read from a memory bank targeted by the first incoming read operation and a cache line corresponding to a location to be read from a memory bank targeted by the second incoming read operation. In one embodiment, the cache line corresponding to a location to be read from the memory bank targeted by the first incoming read operation and the cache line corresponding to the location to be read from the memory bank targeted by the second incoming read operation are the same.

Write access to the cache bank may be blocked by a first incoming read operation and a second incoming write operation when the cache bank contains a cache line corresponding to a location to which data is to be written to a memory bank targeted by the second incoming read operation and a cache line corresponding to a location to be read from a memory bank targeted by the first incoming read operation.

If write control logic 118 determines that write access to the cache bank that does not contain valid data at the location corresponding to the cache address index associated with the first incoming write operation is blocked in either case, flow continues to step 722. Otherwise, flow continues to step 724.

At step 722, write data associated with the first incoming write operation is written to the first target memory bank in response to determining that write access to the at least one of the cache banks is blocked by the at least two incoming read operations.

At step 724, write data associated with the first incoming write operation is written to the at least one cache bank that does not contain valid data and a tag update is performed in response to determining that write access to the at least one of the cache banks is not blocked by the at least two incoming read operations. For example, the write data is written to a location within the at least one cache bank corresponding to the cache address index associated with the first incoming write operation. The tag update is performed to a row corresponding to the cache address index of cache tag memory 112. The tag update sets a value corresponding to the tag address (i.e., the upper portion of the address received via the first write port 106 that is not used as the cache address index). In one embodiment, the tag update sets a value corresponding to the memory bank targeted by the first incoming write operation in the corresponding bank address field 210 of tag field 208 and a value corresponding to the two MSBs of the address index received via second write port 108 in the MSB field 212 of tag field 208.

At step 726, a first cache bank of cache banks $114_0$-$114_4$ that is associated with a bank address that is not equal to the second target memory bank and that has a write access that is not blocked by at least two incoming read operations is determined Write control logic 118 may determine that the first cache bank is associated with a bank address that is not equal to the second target memory bank by searching the row of information received from cache tag memory 112 for a bank address field 210 that contains a value not equal to the second target memory bank. Write control logic 118 may determine whether write access to the first cache bank is blocked by determining whether the first cache bank contains a cache line corresponding to a location to be read from a memory bank targeted by the first incoming read operation and a cache line corresponding to a location to be read from a memory bank targeted by the second incoming read operation.

Turning now to FIG. 7C, at step 728, write control logic 118 determines whether a second cache bank of cache banks $114_0$-$114_4$ contains a cache line corresponding to a location to be read from the second target memory bank by at least two incoming read operations or contains a cache line corresponding to a location to be read from the second target memory bank by a first incoming read operation and a cache line corresponding to a location to which data is to be written to in a memory bank targeted by a second incoming write operation. If write control logic 118 determines that a second cache bank of cache banks $114_0$-$114_4$ contains such cache line(s), flow continues to step 730. Otherwise, flow continues to step 732.

At step 730, write data associated with the first incoming write operation is written to the first target memory bank and the cache line corresponding to the location to which data is to be written to in the first target memory bank is invalidated in response to determining that the second cache bank contains a cache line corresponding to the location to be read from the second target memory bank by the at least two incoming read operations or in response to determining that the second cache bank contains a cache line corresponding to the location to be read from the second target memory bank by the first incoming read operation and that the second cache bank contains a cache line corresponding to the location to which data is to be written to in a memory bank targeted by a second incoming write operation.

Write control logic 118 may invalidate the cache line by performing a tag update to cache tag memory 112. The tag update may set a value stored in the corresponding valid field of cache tag memory 112 to '0' (or some other value that indicates that the cache line is invalid) and/or sets the value stored in the corresponding tag field of cache tag memory 112 to a value that is not used to represent memory banks $110_0$-$110_{11}$ (e.g., 0xC, 0xD, 0xE, or 0xF).

At step 732, write control logic 118 determines whether a location corresponding to the cache address index associated with the first incoming write operation of the first cache bank contains data that is to be overwritten by a second incoming write operation in response to determining that the second cache bank does not contain a cache line corresponding to the location to be read from the second target memory bank by the at least two incoming read operations or in response to determining that the second cache bank does not contain a cache line corresponding to the location to be read from the second target memory bank by a first incoming read operation or a cache line corresponding to the location to which data is to be written to in a memory bank targeted by a second incoming write operation. Write control logic 118 may determine that the second incoming write operation is to overwrite the data if the second incoming write operation is configured to write data to the same address (i.e., same memory bank and same address index) to which the first incoming write operation is to write data. If write control logic 118 determines that the location corresponding to the cache address index associated with the first incoming write operation of the first cache bank contains data that is to be overwritten by the second incoming write operation, flow continues to step 734. Otherwise, flow continues to step 736.

At step 734, the write data associated with the first incoming write operation is written to the location corresponding to the cache address index associated with the first incoming write operation of the first cache bank and a tag update is performed in response to determining that the location corresponding to cache address index associated with the first incoming write operation of the first cache bank contains data to be overwritten by the second incoming write operation. The tag update is performed to a row corresponding to the cache address index of cache tag memory 112. The tag update sets a value corresponding to the tag address. In one embodiment, the tag update sets a value corresponding to the memory bank targeted by the first incoming write operation in the corresponding bank address field 210 of tag field 208 and a value corresponding to the two MSBs of the address index received via second write port 108 in the MSB field 212 of tag field 208.

At step 736, the data from the location corresponding to the cache address index associated with the first incoming write operation of the first cache bank is written to the first target memory bank, the write data associated with the first incoming write operation is written to the location corresponding to the cache address index associated with the first incoming write operation of the first cache bank, and a tag update is performed in response to determining that the location corresponding to cache address index associated with the first incoming write operation of the first cache bank does not contain data to be overwritten by the second incoming write operation.

Data is written from the location corresponding to the cache address index associated with the first incoming write operation of the first cache bank to the first target memory bank because this data may be associated with a previously-blocked write operation. If the write data associated with the first incoming write operation were to overwrite this data, the data would be lost. As a result, before the write data associated with the first incoming write operation is written to the location, the data from the previously-blocked write operation is written to the target memory bank specified by the value stored in the corresponding tag field of cache tag memory 112.

The tag update is performed to a row corresponding to the cache address index of cache tag memory 112. The tag update sets a value corresponding to the tag address. In one embodiment, the tag update sets a value corresponding to the memory bank targeted by the first incoming write operation in the corresponding bank address field 210 of tag field 208 and a value corresponding to the two MSBs of the address index received via second write port 108 in the MSB field 212 of tag field 208.

III. Other Example Embodiments

Embodiments described herein may generally be used with any type of memory. In one embodiment, the memory may be a circuit included on a device with other types of circuits. For example, the memory may be integrated into a processor device, memory controller device, or other type of integrated circuit device. Devices into which the memory is integrated may include system-on-a-chip (SOC) devices. In another embodiment, the memory may be provided as a memory device which is used with a separate memory controller device or processor device.

Whether the memory is integrated into a device with other circuits or provided as a separate device, the memory may be used as part of a larger computer system. The computer system may include a motherboard, central processor, memory controller, the memory, a hard drive, graphics processor, peripherals, and any other devices which may be found in a computer system. The computer system may be part of a personal computer, a server computer, or a smaller system such as an embedded system, personal digital assistant (PDA), or mobile phone.

In some cases, a device including the memory may be packaged together with other devices. Such packages may include any other types of devices, including devices with the same type of memory, devices with different types of memory, and/or devices including processors and/or memory controllers. Also, in some cases, the memory may be included in a device mounted on a memory module. The memory module may include other devices including memories, a buffer chip device, and/or a controller chip device. The memory module may also be included in a larger system such as the systems described above.

In some cases, embodiments may be used with multiple types of memory or with a memory which is included on a device with multiple other types of memory. The memory types may include volatile memory and non-volatile memory. Volatile memories may include static random access memory (SRAM), pseudo-static random access memory (PSRAM), and dynamic random access memory (DRAM). DRAM types may include single data rate (SDR) DRAM, double data rate (DDR) DRAM, low power (LP) DDR DRAM, and any other types of DRAM. Nonvolatile memory types may include magnetic RAM (MRAM), flash memory, resistive RAM (RRAM), ferroelectric RAM (FeRAM), phase-change RAM (PRAM), electrically erasable programmable read-only memory (EEPROM), laser programmable fuses, electrically programmable fuses (e-fuses), and any other types of non-volatile memory.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the the subject matter described herein. Thus, the breadth and scope of the subject matter described herein should not be limited by any of the above-described exemplary embodiments, but should be defined only in accordance with the following claims and their equivalents.

What is claimed is:

1. A memory device, comprising:
   one or more memory banks;
   a plurality of cache banks coupled to each of the one or more memory banks; and
   control logic coupled to each of the one or more memory banks and to the plurality of cache banks, wherein the control logic is configured to:
   determine whether one of the plurality of cache banks contains a cache line corresponding to a location to which data is to be written to in a first target memory bank among the one or more memory banks by a first incoming write operation;
   determine whether the first incoming write operation is blocked by at least one incoming read operation configured to read data from a second target memory bank among the one or more memory banks in response to a determination that one of the plurality of cache banks does not contain a cache line corresponding to the location to which data is to be written to in the first target memory bank by the first incoming write operation;
   write the data associated with the first incoming write operation to the first target memory bank in response to a determination that the first incoming write operation is not blocked by the at least one incoming read operation; and
   determine whether the data associated with the first incoming write operation is to be written to either one of the plurality of cache banks or the first target memory bank in response to a determination that the first incoming write operation is blocked by the at least one incoming read operation.

2. The memory device of claim 1, further comprising:
   at least one cache tag memory, wherein a cache lookup operation is performed on the at least one cache tag memory by the control logic to determine whether one of the plurality of cache banks contains the cache line corresponding to the location to which data is to be written to in the first target memory bank by the first incoming write operation.

3. The memory device of claim 1, wherein the first incoming write operation is blocked by the at least one incoming read operation when at least the first target memory bank and the second target memory bank are the same.

4. The memory device of claim 1, wherein the control logic is configured to determine whether the first incoming write operation is blocked by at least two incoming read operations.

5. The memory device of claim 1, the control logic further configured to, in response to a determination that the first incoming write operation is blocked by the at least one incoming read operation:
   determine whether each of the plurality of cache banks contains valid data at a location corresponding to a cache address index associated with the first incoming write operation;
   in response to a determination that at least one of the plurality of cache banks does not contain valid data at the location corresponding to a cache address index associated with the first incoming write operation, determine whether write access to the at least one of the plurality of cache banks is blocked by the at least one incoming read operation;
   write the data associated with the first incoming write operation to the first target memory bank in response to a determination that write access to the at least one of the plurality of cache banks is blocked by the at least one incoming read operation; and
   write the data associated with the first incoming write operation to the at least one of the plurality of cache banks in response to a determination that write access to the at least one of the plurality of cache banks is not blocked by the at least one first incoming read operation.

6. The memory device of claim 5, wherein write access to the at least one of the plurality of cache banks is blocked when the at least one of the plurality of cache banks contains a cache line corresponding to a location to be read from the second target memory bank by the at least one first incoming read operation.

7. The memory device of claim 5, the control logic further configured to, in response to a determination that each of the plurality of cache banks contains valid data at the location corresponding to cache address index associated with the first incoming write operation:
   determine a first cache bank of the plurality of cache banks that is associated with a bank address that is not equal to the second target memory bank and that has a write access that is not blocked by the first incoming read operation;
   determine whether a second cache bank of the plurality of cache banks contains a cache line corresponding to a location to be read from the second target memory bank by the at least one first incoming read operation;
   write the data associated with the first incoming write operation to the first target memory bank in response to a determination that the second cache bank of the plurality of cache banks contains a cache line corresponding to the location to be read from the second target memory bank by the first incoming read operation;
   determine whether a location corresponding to the cache address index associated with the first incoming write operation of the first cache bank contains data to be overwritten by a second incoming write operation in response to a determination that the second cache bank of the plurality of cache banks does not contain a cache line corresponding to the location to be read from the second target memory bank by the first incoming read operation;
   write the data associated with the first incoming write operation to the location corresponding to the cache address index associated with the first incoming write operation of the first cache bank in response to a determination that the location corresponding to the cache address index associated with the first incoming write operation of the first cache bank contains data to be overwritten by the second incoming write operation; and
   write data from the location corresponding to the cache address index associated with the first incoming write operation of the first cache bank to the first target memory bank and write the data associated with the first incoming write operation to the location corresponding to the cache address index associated with the first incoming write operation of the first cache bank in response to a determination that the location corresponding to the cache address index associated with the first incoming write operation of the first cache bank does not contain data to be overwritten by the second incoming write operation.

8. A method, comprising:
   determining whether one of a plurality of cache banks contains a cache line corresponding to a location to which data is to be written to in a first target memory bank among one or more memory banks by a first incoming write operation;

determining whether the first incoming write operation is blocked by at least one incoming read operation configured to read data from a second target memory bank among the one or more memory banks in response to determining that one of plurality of cache banks does not contain a cache line corresponding to the location to which data is to be written to in the first target memory bank by the first incoming write operation;

writing the data associated with the first incoming write operation to the first target memory bank in response to determining that the first incoming write operation is not blocked by the at least one incoming read operation; and determining whether the data associated with the first incoming write operation is to be written to either one of the plurality of cache banks or the first target memory bank in response to determining that the first incoming write operation is blocked by the at least one incoming read operation.

9. The method of claim 8, further comprising:

determining whether one of the plurality of cache banks contains the cache line corresponding to the location to be written to in the first target memory bank by the first incoming write operation by performing a cache lookup operation on at least one cache tag memory.

10. The method of claim 8, wherein determining whether the first incoming write operation is blocked by at least one incoming read operation comprises:

determining that the first incoming write operation is blocked by the at least one incoming read operation when at least the first target memory bank and the second target memory bank are the same.

11. The method of claim 8, wherein determining whether the first incoming write operation is blocked by at least one incoming read operation comprises:

determining whether the first incoming write operation is blocked by at least two incoming read operations.

12. The method of claim 8, further comprising, in response to determining that the first incoming write operation is blocked by the at least one incoming read operation:

determining whether each of the plurality of cache banks contains valid data at a location corresponding to a cache address index associated with the first incoming write operation;

in response to determining that at least one of the plurality of cache banks does not contain valid data at the location corresponding to a cache address index associated with the first incoming write operation, determining whether write access to the at least one of the plurality of cache banks is blocked by the at least one incoming read operation;

writing the data associated with the first incoming write operation to the first target memory bank in response to determining that write access to the at least one of the plurality of cache banks is blocked by the at least one incoming read operation; and writing the data associated with the first incoming write operation to the at least one of the plurality of cache banks in response to determining that write access to the at least one of the plurality of cache banks is not blocked by the at least one first incoming read operation.

13. The method of claim 12, wherein determining whether write access to the at least one of the plurality of cache banks is blocked comprises:

determining that the at least one of the plurality of cache banks contains a cache line corresponding to a location to be read from the second target memory bank by the at least one first incoming read operation.

14. The method of claim 12, further comprising, in response to determining that each of the plurality of cache banks contains valid data at the location corresponding to the write address index of the first incoming write operation:

determining a first cache bank of the plurality of cache banks that is associated with a bank address that is not equal to the second target memory bank and that has a write access that is not blocked by the first incoming read operation;

determining whether a second cache bank of the plurality of cache banks contains a cache line corresponding to a location to be read from the second target memory bank by the at least one first incoming read operation;

writing the data associated with the first incoming write operation to the first target memory bank in response to determining that the second cache bank of the plurality of cache banks contains a cache line corresponding to the location to be read from the second target memory bank by the first incoming read operation;

determining whether a location corresponding to the cache address index associated with the first incoming write operation of the first cache bank contains data to be overwritten by a second incoming write operation in response to determining that a second cache bank of the plurality of cache banks does not contain a cache line corresponding to the location to be read from the second target memory bank by the first incoming read operation;

writing the data associated with the first incoming write operation to the location corresponding to the cache address index associated with the first incoming write operation of the first cache bank in response to determining that the location corresponding to the cache address index associated with the first incoming write operation of the first cache bank contains data to be overwritten by the second incoming write operation; and writing data from the location corresponding to the cache address index associated with the first incoming write operation of the first cache bank to the first target memory bank and write the data associated with the first incoming write operation to the location corresponding to the cache address index associated with the first incoming write operation of the first cache bank in response to determining that the location corresponding to the cache address index associated with the first incoming write operation of the first cache bank does not contain data to be overwritten by the second incoming write operation.

15. An apparatus, comprising:

control logic circuitry configured to be coupled to each of one or more memory banks and to a plurality of cache banks, wherein the control logic circuitry is configured to:

determine whether one of the plurality of cache banks contains a cache line corresponding to a location to which data is to be written to in a first target memory bank among the one or more memory banks by a first incoming write operation;

determine whether the first incoming write operation is blocked by at least one incoming read operation configured to read data from a second target memory bank among the one or more memory banks in response to a determination that one of the plurality of cache banks does not contain a cache line corresponding to the location to which data is to be written to in the first target memory bank by the first incoming write operation;

write the data associated with the first incoming write operation to the first target memory bank in response to a determination that the first incoming write operation is not blocked by the at least one incoming read operation; and determine whether the data associated with the first incoming write operation is to be written to either one of the plurality of cache banks or the first target memory bank in response to a determination that the first incoming write operation is blocked by the at least one incoming read operation.

16. The apparatus of claim 15, wherein the first incoming write operation is blocked by the at least one incoming read operation when at least the first target memory bank and the second target memory bank are the same.

17. The apparatus of claim 15, wherein the control logic circuitry is configured to determine whether the first incoming write operation is blocked by at least two incoming read operations.

18. The apparatus of claim 15, the control logic circuitry further configured to, in response to a determination that the first incoming write operation is blocked by the at least one incoming read operation:

determine whether each of the plurality of cache banks contains valid data at a location corresponding to a cache address index associated with the first incoming write operation;

in response to a determination that at least one of the plurality of cache banks does not contain valid data at the location corresponding to a cache address index associated with the first incoming write operation, determine whether write access to the at least one of the plurality of number of cache banks is blocked by the at least one incoming read operation;

write the data associated with the first incoming write operation to the first target memory bank in response to a determination that write access to the at least one of the plurality of cache banks is blocked by the at least one incoming read operation; and write the data associated with the first incoming write operation to the at least one of the plurality of cache banks in response to a determination that write access to the at least one of the plurality of cache banks is not blocked by the at least one first incoming read operation.

19. The apparatus of claim 18, wherein write access to the at least one of the plurality of cache banks is blocked when the at least one of the plurality of cache banks contains a cache line corresponding to a location to be read from the second target memory bank by the at least one first incoming read operation.

20. The apparatus of claim 18, the control logic circuitry further configured to, in response to a determination that each of the plurality of cache banks contains valid data at the location corresponding to cache address index associated with the first incoming write operation:

determine a first cache bank of the plurality of cache banks that is associated with a bank address that is not equal to the second target memory bank and that has a write access that is not blocked by the first incoming read operation;

determine whether a second cache bank of the plurality of cache banks contains a cache line corresponding to a location to be read from the second target memory bank by the at least one first incoming read operation;

write the data associated with the first incoming write operation to the first target memory bank in response to a determination that the second cache bank of the plurality of cache banks contains a cache line corresponding to the location to be read from the second target memory bank by the first incoming read operation;

determine whether a location corresponding to the cache address index associated with the first incoming write operation of the first cache bank contains data to be overwritten by a second incoming write operation in response to a determination that the second cache bank of the plurality of cache banks does not contain a cache line corresponding to the location to be read from the second target memory bank by the first incoming read operation;

write the data associated with the first incoming write operation to the location corresponding to the cache address index associated with the first incoming write operation of the first cache bank in response to a determination that the location corresponding to the cache address index associated with the first incoming write operation of the first cache bank contains data to be overwritten by the second incoming write operation; and write data from the location corresponding to the cache address index associated with the first incoming write operation of the first cache bank to the first target memory bank and write the data associated with the first incoming write operation to the location corresponding to the cache address index associated with the first incoming write operation of the first cache bank in response to a determination that the location corresponding to the cache address index associated with the first incoming write operation of the first cache bank does not contain data to be overwritten by the second incoming write operation.

* * * * *